(12) United States Patent
Clarkin

(10) Patent No.: US 7,859,859 B2
(45) Date of Patent: Dec. 28, 2010

(54) PRIMARY SIDE SAMPLED FEEDBACK CONTROL IN POWER CONVERTERS

(75) Inventor: John P. Clarkin, Coventry, RI (US)

(73) Assignee: Picor Corporation, North Smithfield, RI (US)

( * ) Notice: Subject to any disclaimer, the term of this patent is extended or adjusted under 35 U.S.C. 154(b) by 776 days.

(21) Appl. No.: 11/601,890

(22) Filed: Nov. 20, 2006

(65) Prior Publication Data
US 2008/0117656 A1   May 22, 2008

(51) Int. Cl.
H02M 3/335   (2006.01)
(52) U.S. Cl. .......................................... 363/16; 363/17
(58) Field of Classification Search ................... 363/13, 363/17, 18, 19, 20, 21.03, 21.09, 21.12, 21.15, 363/21.17, 56.02, 56.06, 56.09; 323/222, 323/224, 282, 283
See application file for complete search history.

(56) References Cited

U.S. PATENT DOCUMENTS

| 3,764,881 | A |   | 10/1973 | Thomas |
|---|---|---|---|---|
| 5,305,192 | A |   | 4/1994 | Bonte et al. |
| 5,430,633 | A | * | 7/1995 | Smith ........................... 363/20 |
| 5,438,499 | A |   | 8/1995 | Bonte et al. |
| 5,841,643 | A |   | 11/1998 | Schenkel |
| 5,874,841 | A |   | 2/1999 | Majid et al. |
| 6,081,432 | A | * | 6/2000 | Rinne et al. .................... 363/16 |
| 6,333,624 | B1 |   | 12/2001 | Ball et al. |
| 6,421,262 | B1 |   | 7/2002 | Saxelby et al. |
| 7,561,446 | B1 | * | 7/2009 | Vinciarelli .................... 363/17 |
| 2001/0033498 | A1 | * | 10/2001 | Lee .............................. 363/17 |
| 2002/0021574 | A1 | * | 2/2002 | Ishii et al. ...................... 363/20 |
| 2003/0132739 | A1 |   | 7/2003 | Telefus et al. |
| 2004/0207431 | A1 |   | 10/2004 | Haigh et al. |
| 2004/0257839 | A1 |   | 12/2004 | Yang et al. |
| 2006/0209571 | A1 | * | 9/2006 | Aso et al. ................. 363/21.01 |

OTHER PUBLICATIONS

Watson, New Techniques in the Design of Distributed Power System, etds@Vt,UVT,Aug. 7, 1998,p. 88-115.*
Unitrode—Programmable, Off-Line, PWM Controller Datasheet, Jan. 12, 2006.
Patel et al., "Switching Power Supply Design Review—60 Watt Flyback Regulator", Excerpt from Seminar by Unitrode Corporation, 21 pages, 1983.

* cited by examiner

Primary Examiner—Bao Q Vu
Assistant Examiner—Nguyen Tran
(74) Attorney, Agent, or Firm—Fish & Richardson P.C.

(57) ABSTRACT

A primary-side sampled feedback system includes a sample acquisition phase during which the voltage across the clamp capacitor is sensed as a measure of the primary-reflect output voltage. One end of the clamp capacitor is ground-referenced during the sample acquisition phase. The sample circuitry, which may include a transformer-coupled input for receiving the gate drive of the secondary switch, may use secondary-side or primary and secondary side signals to generate the sample acquisition control pulse and clamp switch drive signal. The sample acquisition control pulse occurs when the secondary current reaches its minimum or zero.

46 Claims, 18 Drawing Sheets

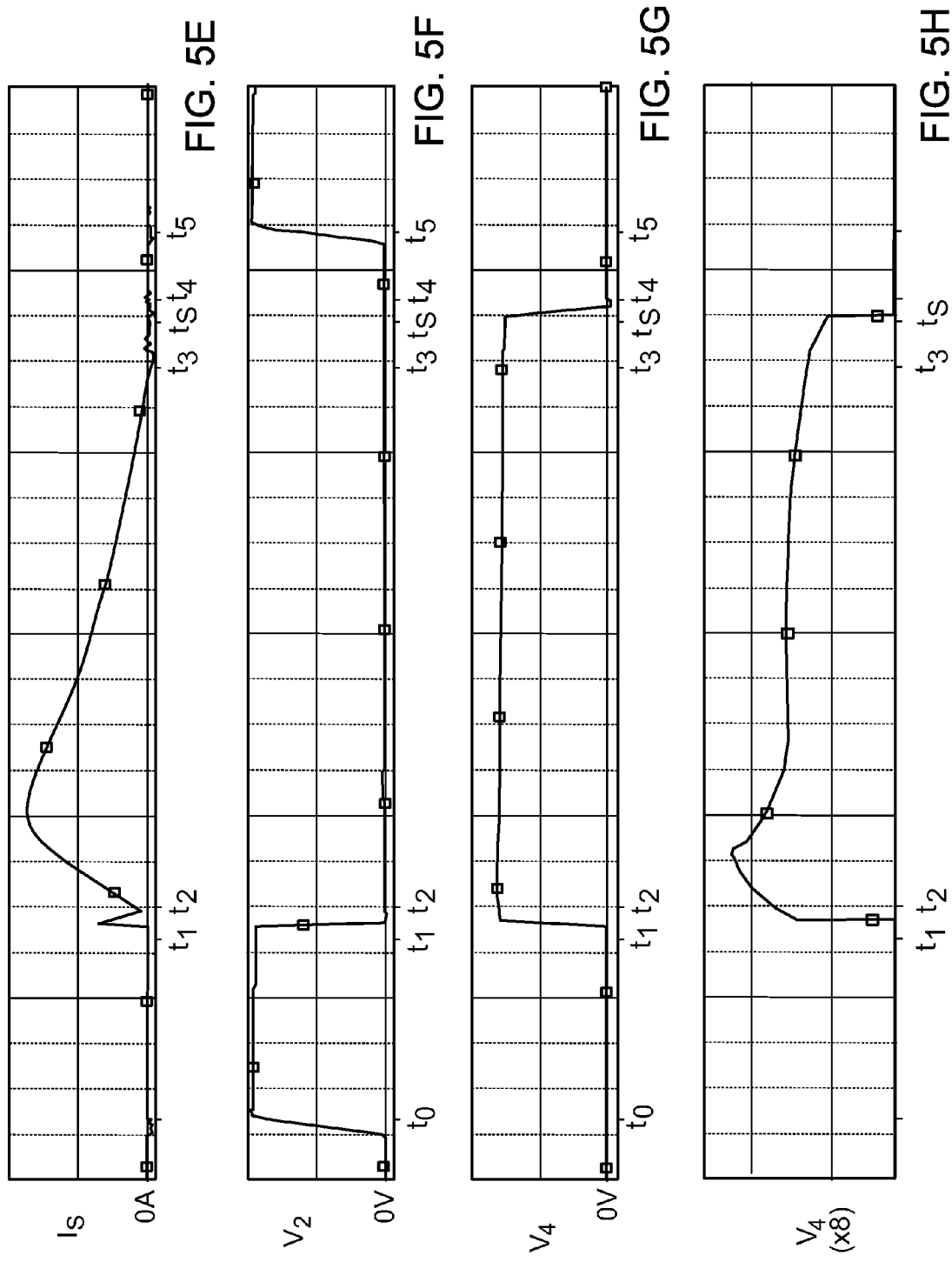

PRIMARY SIDE SAMPLED FEEDBACK CONTROL IN POWER CONVERTERS

TECHNICAL FIELD

This invention relates to DC-DC switching power conversion, and more particularly to feedback control of DC-DC switching power converters across galvanic isolation boundaries.

BACKGROUND

Techniques for feedback control of the output voltage in galvanically-isolated switching power converters has traditionally required use of auxiliary transformer windings or opto-isolators to sense the output voltage across the galvanic isolation boundary. Primary-side sampled feedback circuits using auxiliary windings in fly-back power converters are shown for example in Ball et al., Circuit and Method for a Switching Power Supply with Primary Side Transformer Sensing, U.S. Pat. No. 6,333,624; Bonte et al., Switching Regulator Circuit Using Magnetic Flux-Sensing, U.S. Pat. No. 5,305,192; Bonte et al., Switching Regulator Circuit Using Magnetic Flux-Sensing, U.S. Pat. No. 5,438,499; Majid et al., Sample-and-Hold Circuit for a Switched-Mode Power Supply, U.S. Pat. No. 5,874,841; Telefus et al., Power Converters with Primary-Only Feedback, publication no. US 2003/0132739 A1 published Jul. 17, 2003; Yang et al, Primary-Side Regulated Pulse Width Modulation Controller with Improved Load Regulation, publication no. US 2004/0257839 A1, published Dec. 23, 2004. Similarly, a converter sampling a voltage across the primary winding is shown in Thomas, Transformer-Coupled Power Converter Sampling System, U.S. Pat. No. 3,764,881.

SUMMARY

In general, one aspect features a method for converting power via a transformer from an input source for delivery to a load. The method includes providing a primary power circuit including the primary winding, at least one primary switch connected to drive the primary winding, a clamp capacitor, and a clamp switch adapted to connect the clamp capacitor to the primary winding. Secondary circuitry adapted to deliver a rectified output voltage to the load may be provided. The secondary circuitry may include a secondary winding of the transformer and rectification circuitry connected to the secondary winding. A switch controller adapted to operate the primary switch(es) and the clamp switch in a series of converter operating cycles may be provided. The converter operating cycles may be characterized by a current in the secondary winding varying between a maximum value and a minimum value. A first signal may be generated in response to detection of the current in the secondary winding essentially reaching the minimum value. A voltage in the primary power circuit may be sampled in response to the first signal as a measure of the output voltage.

In general, another aspect features a method including converting power, received at an input from an input source at an input voltage, via a transformer for delivery to a load at an output voltage, in a series of converter operating cycles. Energy may be transferred from the input source to a primary winding of the transformer during an energy-storage phase. The energy storage phase may be characterized by an average value of primary current flowing in the primary winding. The average value of primary current taken over the duration of the energy-storage phase may have a first polarity. Energy may be transferred from a secondary winding of the transformer to the load during an energy-transfer phase. The energy-transfer phase may be characterized by connecting a clamp capacitor to the transformer. The voltage across the clamp capacitor may be sampled during a sample-acquisition phase. The voltage across the clamp capacitor during the sample-acquisition phase may be essentially a function of the primary reflected output voltage. The output voltage may be controlled as a function of the sensed clamp capacitor voltage.

In general, another aspect features apparatus for converting power via a transformer from an input source for delivery to a load. A primary power circuit may include a primary winding of the transformer, at least one primary switch connected to drive the primary winding, a clamp capacitor, and a clamp switch adapted to connect the clamp capacitor to the primary winding. Secondary circuitry adapted to deliver a rectified output voltage to the load may include a secondary winding of the transformer and rectification circuitry connected to the secondary winding. A switch controller may be adapted to operate the primary switch(es) and the clamp switch in a series of converter operating cycles. Each converter operating cycle may be characterized by a current in the secondary winding varying between a maximum value and a minimum value. The controller may be adapted to generate a first signal in response to detection of the current in the secondary winding essentially reaching the minimum value. A voltage in the primary power circuit may be sampled in response to the first signal as a measure of the output voltage.

In general, another aspect features apparatus for converting power from an input source at an input voltage for delivery to a load at an output voltage. A transformer may include a primary winding and a secondary winding. Secondary circuit elements may be connected to the secondary winding to deliver power to the load at the output voltage. Active clamp circuitry may be connected to the transformer. The clamp circuitry may include a clamp switch and a clamp capacitor. One or more primary switches may be connected to the primary winding. A switch controller may be adapted to operate the clamp switch and the primary switch(es) in a series of converter operating cycles. Each converter operating cycle may include an energy-storage phase during which energy is transferred from the input source to the primary winding and characterized by an average value of primary current flowing in the primary winding. The average value of primary current taken over the duration of the energy-storage phase may have a first polarity. Each converter operating cycle may include an energy-transfer phase during which energy is transferred from the secondary winding of the transformer to the load and characterized by connecting the clamp capacitor to the transformer. Each converter operating cycle may include a sample-acquisition phase during which a voltage across the clamp capacitor is sensed. The voltage across the clamp capacitor during the sample-acquisition phase may be essentially a function of the primary reflected output voltage. The controller may be adapted to control the output voltage as a function of the sensed clamp capacitor voltage.

Implementations of the above methods and apparatus may include one or more of the following features. Each converter operating cycle may include a first time interval during which the current in the secondary winding remains essentially equal to the minimum value and one end of the primary winding is connected to a common reference potential. The voltage across the clamp capacitor may be sensed. The voltage across the primary winding may be sensed. The minimum value may be essentially zero current. Each converter operating cycle may include an energy-transfer phase during which energy is transferred from the secondary winding to the load and the current in the secondary winding decreases to essentially zero current. Each converter operating cycle may include an energy transfer phase during which energy is transferred from the secondary winding to the load and which is terminated before the current in the secondary winding decreases to essentially zero current. The sample-acquisition phase may or may not be coincident with other phases of the converter operating cycle. The sample acquisition phase may occur after the energy transfer phase. The sample acquisition phase may occur during the energy storage phase. The sample acquisition phase may occur anytime during the converter operating cycle except during the energy-transfer phase. Each converter operating cycle may include a clamp phase during which the primary winding of the transformer is clamped. The clamp phase may be characterized by essentially zero voltage across the primary winding and an average value of current flowing in the primary winding. The average value of current taken over the duration of the clamp phase may have a second polarity opposite of the first polarity. The sample acquisition phase may occur during the clamp phase. The voltage across the clamp capacitor during the sample phase may be essentially equal to the primary reflected output voltage. The sample acquisition phase may be further characterized by essentially zero current flowing in the secondary winding. One end of the primary winding may be connected to a common reference terminal during the sample acquisition phase or during at least a portion of the converter operating cycle. The energy transfer phase may be further characterized by one end of the primary winding being connected to a common reference terminal. The energy transfer phase may be further characterized by the current in the secondary winding decreasing to essentially zero. The energy transfer phase may be terminated before the current in the secondary winding decreases to essentially zero current. A resonant circuit including the primary winding and the clamp capacitor may be formed. A first signal may be generated in response to detection of a current in the secondary winding essentially reaching a minimum value during the energy-transfer phase. The sample-acquisition phase may be initiated in response to the first signal. The detection may include sensing a current in the secondary winding, a change in polarity of a voltage across a secondary switch, a change in voltage across the secondary winding, a change in a control signal for operating a secondary switch, when a secondary switch opens, or a change in voltage across a rectifier connected to the secondary winding or a change in voltage across a portion of the rectification circuitry. The first signal may be generated from a control signal for operating a secondary switch.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5A through FIG. 5H show operating waveforms for the converter of FIG. 1.

Like reference symbols in the various drawings indicate like elements.

DETAILED DESCRIPTION

Figure 1:
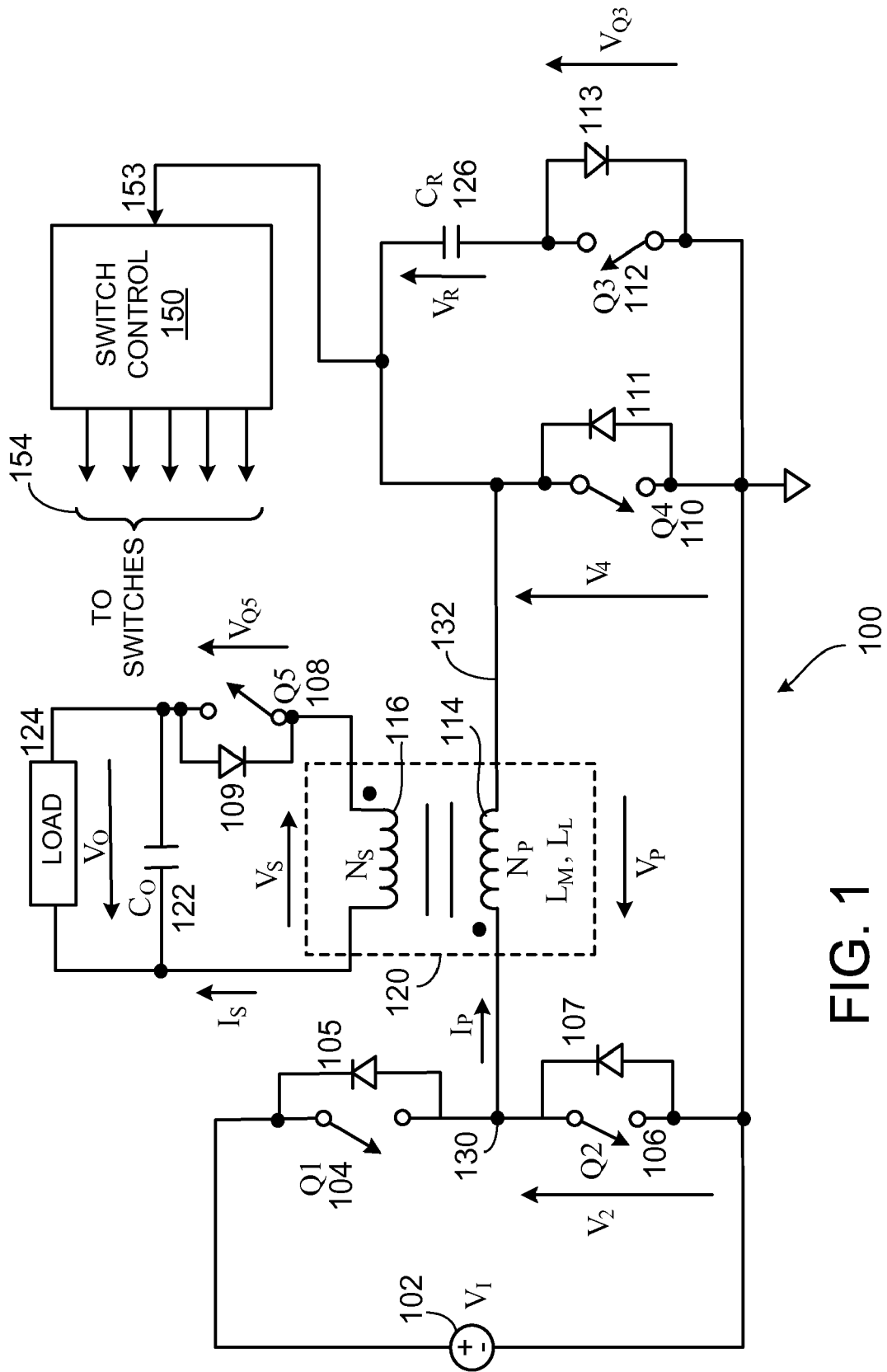
FIG. 1 is a schematic of a double-clamped buck-boost power converter using primary-side sampled feedback control.

Operation of the primary-side sampled-feedback control system will be described in the context of a double-clamped ZVS buck-boost power converter 100 as shown in FIG. 1. The double-clamped ZVS buck-boost power converter topology is described in detail in Vinciarelli, Double-Clamped ZVS Buck-Boost Power Converter, U.S. patent application Ser. No. 11/228,068, filed Sep. 15, 2005 (the "Double-Clamped application"), the contents of which are incorporated here by reference.

In FIG. 1, power converter 100 is shown including a switch controller 150 having a feedback input 153, e.g., for sensing a primary-side voltage representative of the output voltage, and switch control outputs 154, e.g., for controlling switches, Q1 through Q5, within the converter (e.g., as a means of controlling the converter output voltage $V_o$). Although the controller 150 is represented as a single block in FIG. 1, it may comprise circuitry on the primary-side and secondary-side of the transformer as discussed further below.

The converter includes a transformer 120, characterized by a turns ratio $N=N_S/N_P$, where $N_S$ and $N_P$ are, respectively, the number of turns in the secondary winding 116 and in the primary winding 114 of transformer 120. The transformer is also characterized by a magnetizing inductance of value, $L_M$, and primary-referenced leakage inductance of value, $L_L$, where both $L_M$ and $L_L$ may be set, by design, to pre-determined, finite, values and where, generally, the magnetizing inductance is much greater than the leakage inductance ($L_M \gg L_L$). Converter 100 includes primary switches Q1 104, Q2 106, and Q4 110 (each having a respective parallel connected diode 105, 107, 111) connected to the primary winding 114 in the circuit. Secondary switch Q5 108 and its parallel connected diode 109 are connected to the secondary winding 116. Clamp switch Q3 112 along with its associated parallel connected diode 113 and clamp capacitor $C_R$ 126 form an active clamp circuit, described below. MOSFET devices may be used for any or all of switches Q1-Q5 in which case the intrinsic body diode of the MOSFET may be used for the parallel-connected diode.

As used herein, the terms "leakage inductance" and "primary-referenced leakage inductance" shall mean the primary-referenced, uncoupled, inductance of a transformer (i.e., the inductance measured at the primary winding of the transformer with perfect short circuits across all other transformer windings). It is also to be understood that "leakage inductance" and "primary-referenced leakage inductance may also comprise discrete or parasitic inductances that are in series with the primary winding of the transformer (either physically or by reflection from another winding).

The converter 100 receives power from input source 102 which delivers a DC input voltage, $V_1$, to the converter input. The converter delivers power to load 124 at an output voltage, Vo, which is rectified and smoothed by secondary circuitry, including secondary switch Q5 108, parallel diode 109, and output filter capacitor $C_o$ 122. In general, the magnitude of both the input voltage, $V_1$, and the load 124 may vary over a range of values. The switch controller adjusts the operation of the switches to regulate the output voltage.

A. Mode 1 Timing Architecture.

The converter 100 may be operated in different modes as described in detail in the Double-Clamped application. Waveforms for the converter 100 of FIG. 1 operating with the sampled feedback control system are shown in FIGS. 4A-4I. Referring to FIGS. 4A-4I, a converter operating cycle, having a converter operating period of duration $T_{M1-S}$, is shown comprising a series of seven phases described in detail below. Each phase in the converter operating cycle may be characterized by its function (e.g., enabling storage of energy in the transformer) and the states of the switches Q1-Q5 during the phase.

The following description presents a slightly modified operating mode ("Mode 1-S" or M1-S as illustrated in FIGS. 4A-4I) which is based upon the first operating mode ("Mode 1" or "M1") timing architecture (illustrated in FIGS. 9A-9I) described in the Double-Clamped application. Mode 1-S (FIG. 4) is similar to Mode 1 (FIG. 9) in the use of the energy-storage, energy-transfer, clamp, and several ZVS phases, however, a sample-acquisition phase (3B) (301 in FIG. 4C) has been added. The suffix "S" denotes the additional sample acquisition phase. For ease of comparison, the time labels $t_0$ through $t_5$ (used in FIGS. 9A-9J and in the Double-Clamp application) are also used in FIGS. 4A-4I to designate Mode 1-S phase transitions that have counterparts in Mode 1. The additional time label $t_S$, has been added in FIGS. 4A-4I for the additional transition in Mode 1-S as described below.

The following discussion assumes that the value of the output filter capacitor $C_o$ 122 is sufficiently large to maintain the converter output voltage, Vo, at an essentially constant level.

1. Energy Storage Phase.

At time $t_o$, switch Q4 may remain ON (FIG. 4D) from the last phase of the previous converter operating cycle and switch Q1 may be turned ON (FIG. 4A), initiating an energy-storage phase. During the energy-storage phase, a primary current $I_P$ (FIG. 4F) flows from the input source 102 into the primary winding 114 of the transformer 120. As shown in FIG. 4F, the primary current ramps up during the energy-storage phase reaching a maximum current, $I_P=I_1$, shortly after switches Q1 and Q4 are turned OFF at the end of the energy-storage phase (e.g., at time $t_1$). The primary current will continue to ramp up after switches Q1 and Q4 are turned OFF (during the early portion of ZVS phase A) for as long as the primary voltage Vp is positive as shown in FIG. 4F. The primary current, $I_P$, is positive and flows in the direction of the arrow (FIG. 1) at time $t_1$. An average of the primary current, taken over the duration of the energy-storage phase, is positive using the conventions shown in FIG. 1. With secondary switch Q5 OFF and the polarities of the transformer windings as indicated, and ignoring leakage and other parasitic currents, the secondary current, $I_S$, is zero throughout the energy-storage phase of the operating cycle.

2. ZVS Phase A.

Primary switches Q1 104 and Q4 110 may be turned OFF at or shortly after time $t_1$, terminating the energy-storage phase, blocking further energy transfer between the input source and the transformer, and initiating zero-voltage switching ("ZVS") phase A of the converter operating cycle. As used herein, ZVS refers to partially or fully charging and discharging circuit capacitances to achieve a reduction or complete elimination of the voltage across a switch as a means of reducing switching losses when the switch is turned ON. When switch Q1 turns OFF, the positive flow of current in the primary winding, $I_P$ charges and discharges the parasitic capacitances associated with node 130, including the parasitic capacitances of switches Q1 and Q2 (not shown), causing the voltage V2 to decline towards zero in preparation for ZVS turn ON of switch Q2. When Q4 turns OFF, the positive flow of current $I_P$ charges and discharges the capacitances associated with node 132 including the parasitic capacitances of switches Q3 and Q4 (not shown) and any other capacitances at node 132, causing the voltage V4 at node 132 to increase in preparation for ZVS turn ON of switch Q3.

At time $t_2$, the voltage V2 (FIG. 4H) at node 130 is clamped to essentially zero volts by conduction of diode 107 and, at approximately the same time, the voltage V4 (FIG. 4I) at node 132 is clamped to the clamp voltage, $V_R$, across clamp capacitor, $C_R$ 126, by conduction of diode 113. As will be discussed below, the clamp voltage, $V_R$, is essentially equal to the primary-reflected value of the output voltage, $V_o$, i.e. $V_R \approx V_o/N$. Therefore, at time $t_2$ the secondary voltage, $V_S$ (FIG. 1), is negative and essentially equal to $V_o$ and the voltage across secondary switch Q5 and its associated parasitic capacitance (not shown) is also approximately zero.

As the capacitances at nodes 130 and 132 charge and discharge during ZVS phase A, the voltage, $V_p$, across the primary winding will vary from an initial positive value at the beginning of the phase to a negative value at the end of the phase. Thus, as shown in FIG. 4F, the primary current, $I_P$, will continue to increase during a first portion of ZVS phase A and will decline during the remainder of the phase.

3. Energy Transfer Phase.

At about time $t_2$, switches Q2, Q3, and Q5 may be turned ON and switches Q1 and Q4 may be kept OFF, initiating an energy-transfer phase of the converter operating cycle. Because the voltage across each of switches Q2, Q3, and Q5 is essentially zero at time $t_2$, the switches turn ON essentially without loss.

Figure 6:
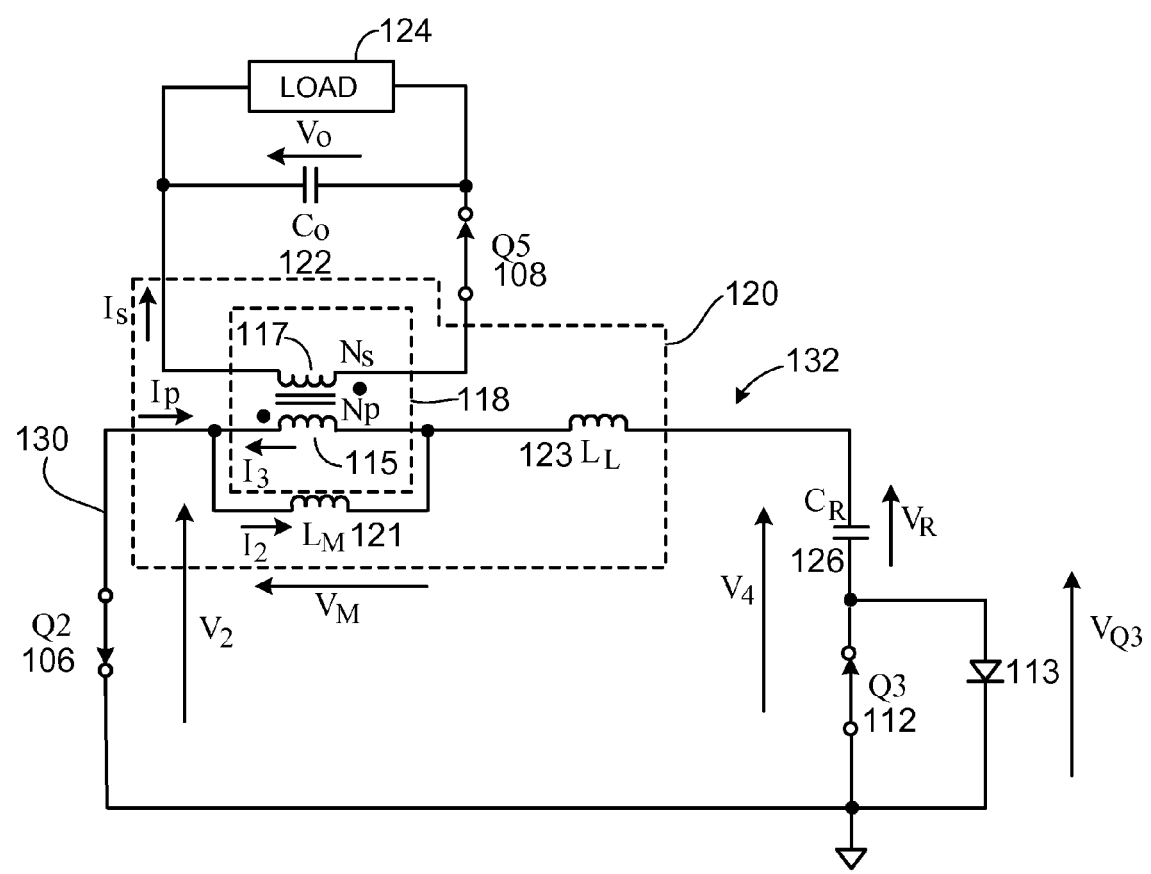
FIG. 6 illustrates the circuit configuration during the energy transfer phase of an operating cycle.

FIG. 6 is a circuit model of the basic converter 100 during the energy-transfer phase in which the transformer 120 is replaced with a simplified transformer equivalent circuit comprising an ideal transformer 118 having a turns ratio equal to $N=N_S/N_P$; a primary-referenced magnetizing inductance, $L_M$ 118; and a primary-referenced leakage inductance, $L_L$ 123. The inductance $L_L$ of FIGS. 1 and 6 may comprise the primary-referenced leakage inductance of the transformer alone or may additionally comprise an inductance connected in series with transformer windings.

With reference to FIGS. 6 and 4, after time $t_2$ the output voltage $V_o$ is reflected back into the primary winding of the ideal transformer 118 as a negative voltage $V_M=-V_o/N$. If there were no transformer leakage inductance, $L_L$ 123, the energy stored in the magnetizing inductance, $L_M$ 121, of the transformer 120 would immediately commutate into the secondary winding and transfer energy toward the load. Owing to the presence of leakage inductance 123, however, instantaneous commutation to the secondary is impeded. The leakage inductance $L_L$ 123 and the clamp capacitor $C_R$ 126 form a damped resonant circuit (the damping being caused by the presence of circuit resistances (not shown) including, e.g., the resistances of switches Q2, Q3, and Q5 and the transformer windings). In the absence of the clamp capacitor, the leakage inductance would, at time $t_2$, resonate with the parasitic capacitance of node 132, resulting in a relatively high frequency and high amplitude oscillation, producing undesirable high-frequency noise and dissipation of energy stored in the transformer leakage inductance. The higher peak voltage at node 132 would also require a higher voltage rating for switch Q4.

A damped resonant current, $I_P$, therefore flows in the primary winding during the period following time $t_2$ as illustrated in FIG. 4F. The secondary current as shown in FIG. 4G, $I_S = -I_3/N = (I_2 - I_P)/N$, comprises: (1) a trapezoidal component, indicated between times $t_2$ and $t_3$ in FIG. 4G by a dashed line, associated with commutation of magnetizing energy into the secondary (i.e., current $I_2/N = I_1/N - (N \cdot V_o)(t-t_2)/L_M$, where $I_1 = I_P(t_2)$ is the peak value of the primary current, $I_P$, at time $t_2$) and (2) an oscillatory component corresponding to the secondary-reflected value of the primary current $I_P$ flowing in the primary-referenced leakage inductance $L_L$. The net effect is a rise in secondary current $I_S$ with a controlled slew rate from an initial value of zero at time $t_2$. As a result, switch Q5 may be turned ON under essentially zero-current and essentially zero-voltage conditions at about time $t_2$. In less ideal embodiments, switch Q5 may be turned ON at a current less than the peak value.

The resonant period, $T_{R1}$, of the resonant circuit ($C_R$, $L_L$) may be relatively short compared to the energy-transfer phase, as illustrated in FIG. 4G, in which case, energy transferred from the leakage inductance to the clamp capacitor is essentially released to the secondary prior to the end of the energy-transfer phase. On the other hand, if the resonant period, $T_{R1}$, is long relative to the operating period of the converter, $T_{M1-S}$, a circulating current will flow in clamp switch Q3 throughout the entire duration of the energy-transfer phase causing dissipation. The value of $C_R$ may be chosen to limit the slew rate of the secondary current, $I_S$, enabling secondary switch Q5 to be turned ON after Q1 and Q4 are turned OFF, and before $I_S$ reaches its peak value. This is particularly important in low output voltage converters where the forward voltage drop of the body drain diode of switch Q5 is much larger than the voltage drop across switch Q5 in its ON state. In such low output voltage applications, slew rate limiting of $I_S$ by a suitably chosen value of clamp capacitance $C_R$ may be used to optimize converter efficiency. As discussed in more detail below, however, Mode 1-S operation presents additional considerations for the optimal value of $C_R$.

The energy-transfer phase ends at time $t_3$ when the secondary current, $I_S$, declines to zero.

4. Sample Acquisition Phase

In Mode 1-S operation, a short sample acquisition phase is added at the end of the energy-transfer phase. At the end of the energy-transfer phase and the beginning of the sample-acquisition phase, the primary voltage is essentially equal to the output voltage divided by the transformer turns ratio, $V_P = -V_o/N$. With primary switch Q2 ON and clamp switch Q3 ON during the energy-transfer and sample-acquisition phases: the voltages across switch Q2 ($V_2$) and switch Q3 ($V_{Q3}$) are essentially zero ($V_2 \approx V_{Q3} \approx 0$); the primary winding 114 (FIG. 1) is effectively connected in parallel with the clamp capacitor, $C_R$; and the voltage, $V_4$, at node 132 is essentially equal to the voltage across the primary winding ($V_4 \approx V_R \approx V_P$). Therefore, the clamp capacitor, $C_R$, will be charged to the primary-reflected output voltage at time $t_3$, at the end of the energy-transfer phase and the voltage, $V_4$, at node 132, may be used as a close measure of the output voltage ($V_4 \approx -V_P = V_o/N$) during the sample-acquisition phase.

Like in the Mode 1 timing architecture, the secondary switch Q5 may be turned OFF at or shortly after time $t_3$ when the secondary current, $I_S$, has declined to zero. Unlike Mode 1, however, the clamp switch Q3 may be kept ON for a short time past $t_3$, until time $t_S$, as shown in FIG. 4C to create a window within which the clamp capacitor voltage, $V_R$, or the voltage, $V_4$, at node 132 may be sensed.

Referring to FIGS. 5G and 5H, waveforms for the voltage $V_4$ are shown, using an over damped resonant circuit and a resonant period much greater than the energy-transfer interval. FIG. 5H uses a smaller vertical scale providing an 8× magnification of the top portion of the waveform which appears relatively flat in FIG. 5G. The initial peak in $V_4$ shown in FIG. 5H just after time $t_2$ is a result of the voltage drop across the parasitic resistances in the primary circuit (e.g. clamp switch Q3 in series with clamp capacitor voltage, $V_R$), not the result of a resonant peak as shown in FIG. 4I. The gradual decline in $V_4$ after the initial peak during the energy-transfer phase reflects the falling voltage drops across parasitic resistances in secondary switch Q5 and secondary winding 116 caused by the falling secondary current. As the secondary current approaches zero (at time $t_3$), the voltage across the primary winding, $V_P$, and therefore the voltage $V_4$ at node 132 which is approximately equal to $-V_P$, approach a value essentially equal to the primary-reflected value of the output voltage $V_o(-V_P = V_o/N)$. The best correlation between $V_4$ and the output voltage is at the end of the energy-transfer phase, at time $t_3$, when the secondary current has declined to zero and the primary current is near zero. The sampled-feedback system exploiting this relationship, senses the voltage $V_4$ at node 132 (which is stabilized by the clamp capacitor) ($V_4 \approx V_R \approx -V_P$) just as the secondary current passes through zero. The sample acquisition phase is preferably kept very short, e.g. 35 nS, because the primary current, $I_P$, may begin to build in the negative direction (as shown in FIG. 4F) with the primary connected across the clamp capacitance.

The optimal value of clamp capacitance, $C_R$, for the Mode 1-S operation may be chosen to ensure that resonant ringing (which could lead to poor regulation) is not present at the end of the energy-transfer phase. The period and damping of the resonant circuit should be set to ensure that the resonant current is consistent and minimal during the sample-acquisition phase. A short resonant period relative to the duration of the energy-transfer phase in combination with critical or over damping will ensure that the resonant energy will be transferred to the secondary before the end of the energy-transfer phase thereby eliminating sampling errors due to ringing during the sample acquisition phase. Alternatively, a long resonant period relative to the duration of the energy-transfer phase in combination with over damping may also prevent ringing at the end of the energy-transfer phase. In general, the value of $C_R$ is best determined empirically depending on the specific requirements of the application, including choice of operating frequency and transformer leakage inductance.

5. ZVS Phase B.

At time $t_S$ a small negative current flows in the primary winding; the secondary current, $I_S$, is essentially zero; the voltage across open switch Q4 is essentially equal to $V_4 = V_o/$ N, the secondary switch Q5 is OFF, and clamp switch Q3 may be turned OFF at or shortly after time $t_S$ initiating ZVS phase B of the converter operating cycle. During ZVS phase B (i.e., the interval between times $t_S$ and $t_4$), the capacitance at node 132 (FIG. 1) discharges resonantly back through the transformer primary inductance ($L_{PRI} \approx L_M + L_L$). At time $t_4$, a negative (using the conventions of FIG. 1) current, $I_P$, flows in the primary winding of the transformer and as the voltage $V_4$ at node 132 attempts to reverse in polarity, diode 111 conducts, clamping the voltage $V_4$ to essentially zero volts in preparation for ZVS turn ON of switch Q4 and ending ZVS phase B.

6. Clamp Phase.

As shown in FIGS. 4A-4I, the converter operating cycle may include a clamp phase. At about time $t_4$, switch Q4 may be turned ON (under ZVS conditions) to form a short circuit (in conjunction with switch Q2 which remains ON from ZVS phase B) across the primary winding, initiating a clamp phase of the converter operating cycle. During the clamp phase, a winding of the transformer is shunted by a low resistance shunt path which clamps the voltage across the winding to essentially zero volts while carrying a current flowing in the winding, e.g., switches Q2 and Q4 form a short circuit across the transformer primary winding. As shown in FIG. 4F, a current ($I_P = -I_4$), is flowing in the primary winding at time $t_4$ at the beginning of the clamp phase (the "initial current"). The short duration of the clamp phase and the very low resistance of the shunt path (e.g. the ON resistance of switches Q2 and Q4) minimize dissipation for the energy stored in the transformer, thereby allowing energy to be retained in the transformer until the end of the clamp phase when switch Q2 is turned OFF. Thus, the current flowing in the clamped winding at the end of the clamp phase (the "remaining current") may be essentially equal to the initial current (as exemplified in FIG. 4F by the lack of change in the current ($I_P = -I_4$) during the clamp phase from time $t_4$ to time $t_5$). An average of the primary current, taken over the duration of the clamp phase, has a negative polarity using the conventions shown in FIG. 1. Although, the duration of the clamp phase may exceed 50% of the converter operating cycle under high input voltage and light load conditions, dissipation of the energy stored in the transformer may be minimized by minimizing the ON resistance of switches Q2 and Q4.

Although the remaining current is shown having essentially the same absolute value as the initial current in FIG. 4F, dissipation due to circuit resistances will generally cause a reduction in current. The remaining current need only be sufficient to partially or completely charge and discharge the capacitances at node 130 for the purpose of providing ZVS for switch Q1 during turn ON, allowing for partial dissipation in some ZVS embodiments or complete dissipation in non-ZVS embodiments.

7. ZVS Phase C.

At the end of the clamp phase (time $t_5$), switch Q2 may be turned OFF initiating ZVS phase C of the converter operating cycle. The remaining current i.e., the negative current flowing in the shunted transformer primary winding at the time, $t_5$, when switch Q2 is turned OFF, charges and discharges the parasitic capacitances associated with node 130, causing the voltage $V_2$ to increase. At time $t_o + T_{M1-S}$, the voltage $V_2$ is clamped by diode 104 to be essentially equal to the input source voltage $V_1$, leaving the voltage across Q1 essentially zero in preparation for ZVS turn ON of switch Q1.

Switch Q1 may be turned ON again at the end of ZVS phase C (time $t_o + T_{M1-S}$), initiating the beginning of a new energy-storage phase of a new converter operating cycle. Because switch Q1 turns ON at zero voltage, it does so essentially without loss. The next converter operating cycle proceeds through the same seven phases described above: an energy-storage phase; ZVS phase A; an energy-transfer phase; sample-acquisition phase, ZVS phase B; a clamp phase; and ZVS phase C.

B. Mode 1-S Switch Controller.

In operation the switch control circuitry 150 may sense the value of the primary-reflected output voltage $V_4$ at time $t_3$ by means of sense connection 153, and control the relative timing of the ON and OFF periods of the switches Q1-Q5 in order to maintain $V_o$ at some pre-determined set-point value. The controller 150 may implement any of the control strategies described in the Double-Clamp application, including either varying or keeping constant the converter operating period and using the duration of the clamp phase or the energy-storage phase, or both, as control variables. The switch controller 150 may connect to the gate control terminals of the MOSFET switches by means of gate drive connections 154. Because the output voltage $V_o$ and the input voltage, $V_1$, may be galvanically isolated from each other by transformer 120, the switch controller 150 may also comprise isolation circuitry (e.g., transformer coupling, not shown in FIG. 1).

Secondary switch Q5 may be operated as an ideal rectifier as described in Saxelby et al., Active Rectifier, U.S. Pat. No. 6,421,262 issued Jul. 16, 2002 (incorporated here by reference). Secondary-side control circuitry (not shown) may sense the voltage, $V_{Q5}$, across switch Q5 and may be configured to turn switch Q5 OFF to block current when the voltage, $V_{Q5}$, across switch Q5 is negative (using the conventions shown in FIG. 1) and otherwise to turn switch Q5 ON to conduct current.

Figure 2:
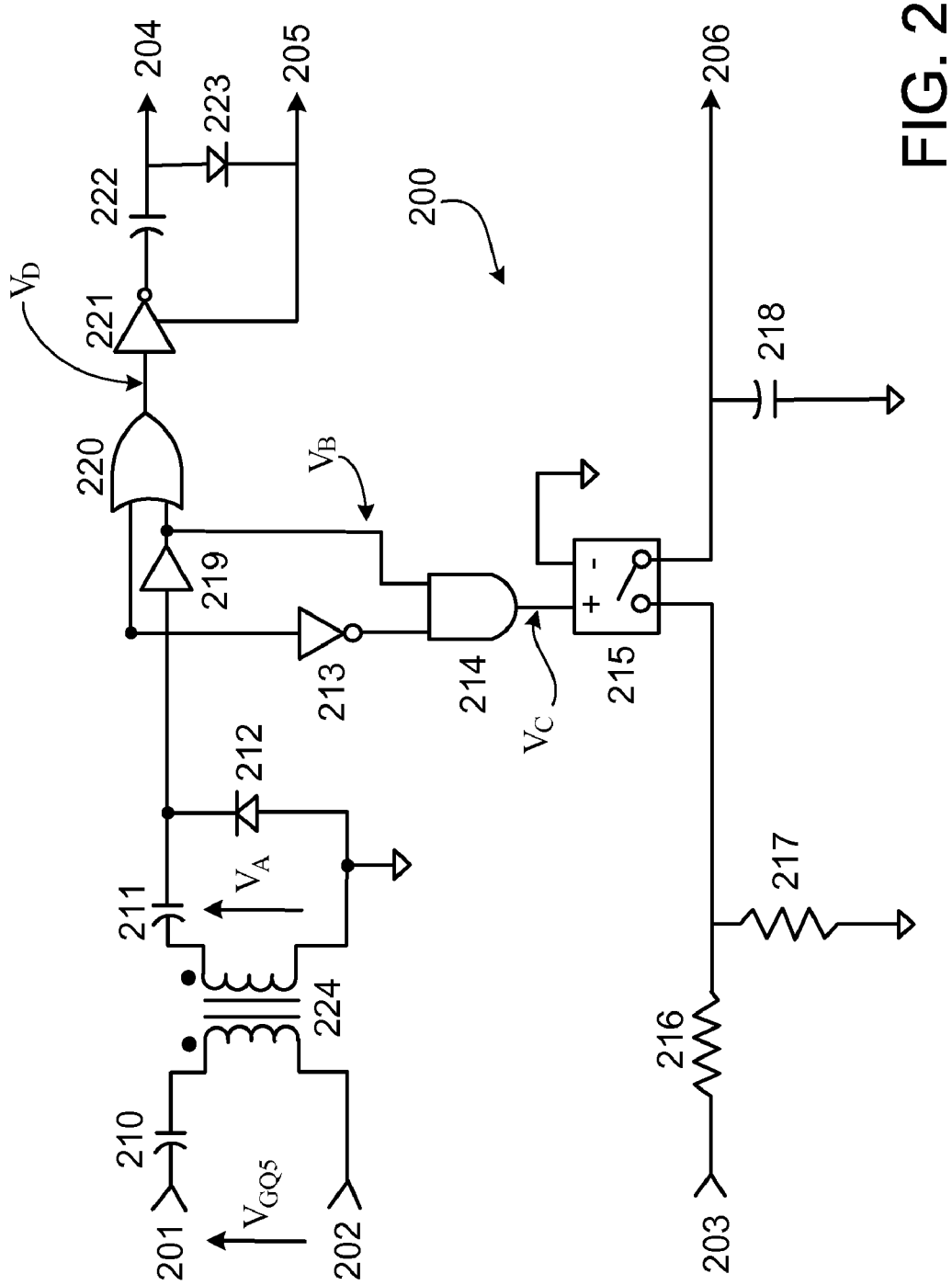
FIG. 2 is a schematic of a portion of a control circuit for use with the converter of FIG. 1.

The Q5 gate drive signal (used to turn secondary switch Q5 ON and OFF) may be used to signal when the secondary current returns to zero at the end of the energy-transfer phase for controlling the primary-side sampled feedback circuitry. Referring to FIG. 2, a circuit 200 is shown for implementing the sampling function in the sampled-feedback control system and for generating the gate drive for turning clamp switch Q3 ON and OFF. Simulations of several waveforms for the converter using the circuitry of FIG. 2 are shown in FIGS. 5A-5H.

Inputs 201, 202 provide connections for receiving the Q5 gate drive signal, $V_{GQ5}$, (FIG. 5B) from the secondary-side control circuitry. Transformer 224 provides galvanic isolation between the secondary-side and primary-side control circuitry. Resistors 216, 217, sample switch 215, and capacitor 218 form a sample and hold circuit for sensing the primary-reflected output voltage at the appropriate time. Delay gate 219, inverter 213, and AND gate 214 generate the sample signal, $V_C$ (FIG. 5C), for turning the sample switch 215 ON and OFF. Delay gate 219, OR gate 220, inverter 221, capacitor 222 and rectifier 223 generate the gate drive signal, $V_{GQ3}$ (shown in FIG. 5A), for clamp switch Q3, which is provided at output connections 204, 205.

Figure 4G:
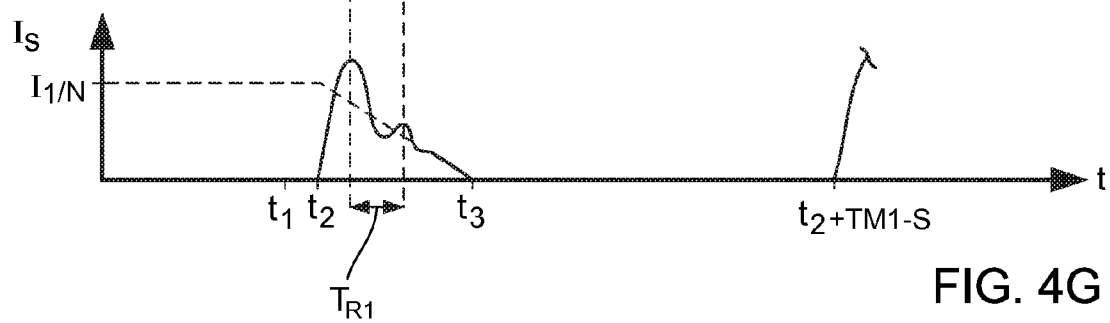
Figure 4H:
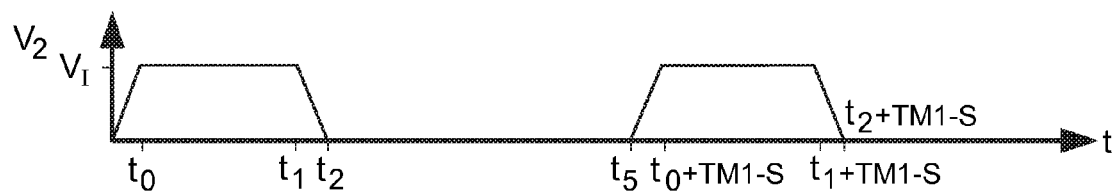
Figure 5A:
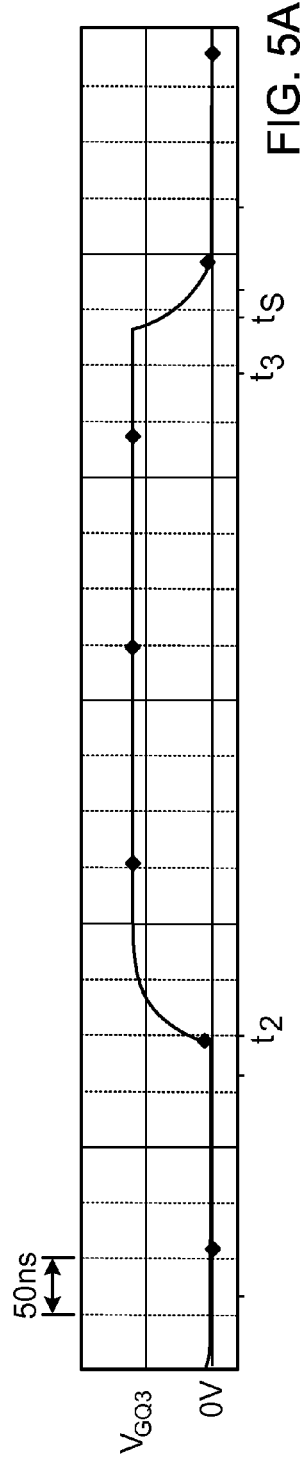
Figure 5B:
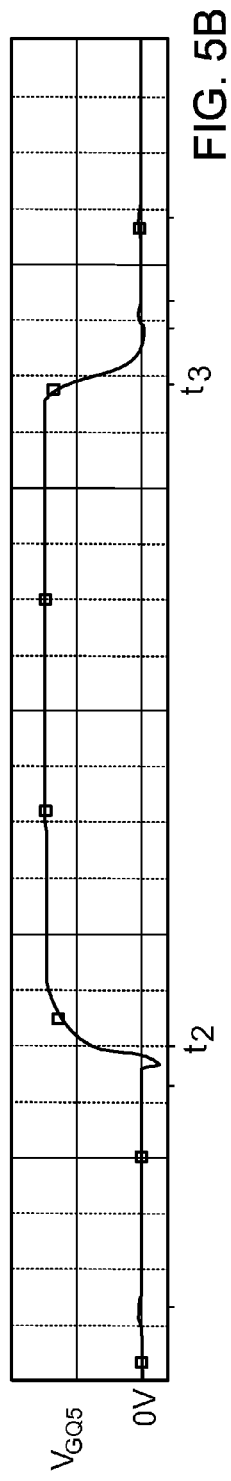
Figure 5C:
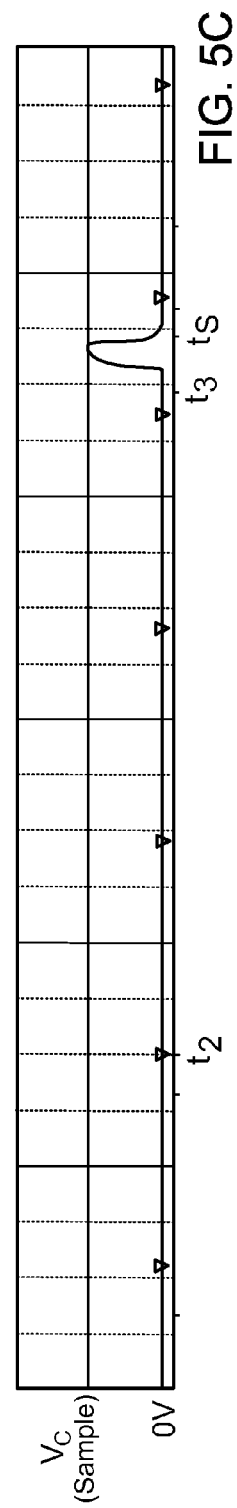
Figure 5D:
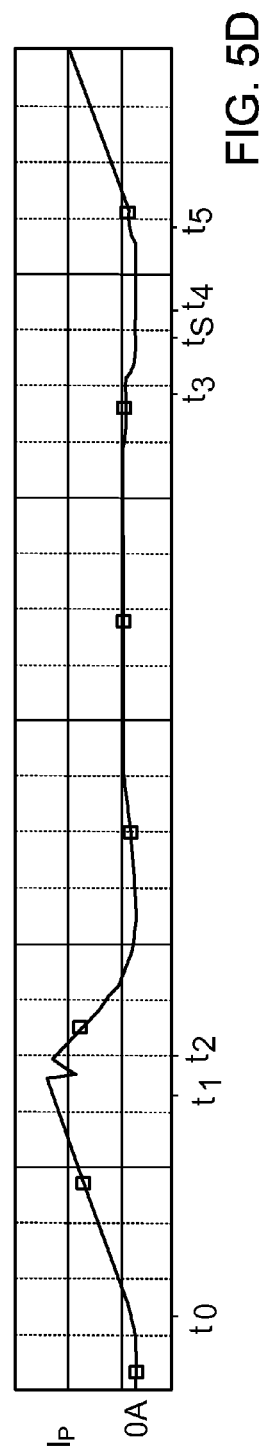

At about time $t_2$ as the secondary current ($I_S$: FIG. 4G) begins to ramp up the voltage $V_{Q5}$ goes positive and the switch controller turns the secondary switch Q5 ON as illustrated in FIG. 5B by the rising gate drive voltage $V_{GQ5}$. As a result, the signal $V_A$ goes high forcing the output, $V_D$, of OR gate 220 high which turns the clamp switch Q3 ON as illustrated by the waveform in FIG. 5A and also forcing the output of inverter 213 low and, as a result, the output, $V_C$, of AND gate 214 low keeping the sample switch 215 OFF as illustrated in FIG. 5C. After the small delay provided by gate 219, signal $V_B$ also goes high affecting no change in either $V_C$ or $V_D$.

At about time $t_3$ as the secondary current ($I_S$: FIG. 4G) reaches zero, the voltage $V_{Q5}$ goes negative and the switch controller turns secondary switch Q5 OFF as illustrated in FIG. 5B by the falling gate drive voltage $V_{GQ5}$. As a result, the signal $V_A$ will return low, forcing the output, $V_C$, of AND gate 214 high which turns the sample switch 215 ON at around time $t_3$ as illustrated in FIG. 5C until the low signal propagates through gate 219. Because of the delay provided by gate 219, the output, $V_D$, of OR gate 220 remains high (keeping the clamp switch Q3 ON) as illustrated by the inverted waveform for $V_{GQ3}$ in FIG. 5A. After the small delay provided by gate 219, signal $V_B$ goes low again turning the sample switch 215 OFF ($V_C$: FIG. 5C) and turning the clamp switch Q3 OFF at around time $t_S$ ($V_{GQ3}$: FIG. 5A).

Input terminal 203 may be connected to node 132 to sense the primary-reflected output voltage. As shown in FIG. 5C, circuit 200 generates a narrow pulse (e.g. 30 nS) between times $t_3$ and $t_S$ to turn the sample switch 215 ON, connecting input terminal 203 to capacitor 218. The sample and hold voltage at output terminal 206 may be connected to a feedback control circuit (not shown) e.g. an error amplifier for comparing the sample and hold voltage to a reference voltage and to produce an error signal which may be used by the switch controller to adjust the relative timing of the switches to reduce the error in the output voltage.

Figure 3:
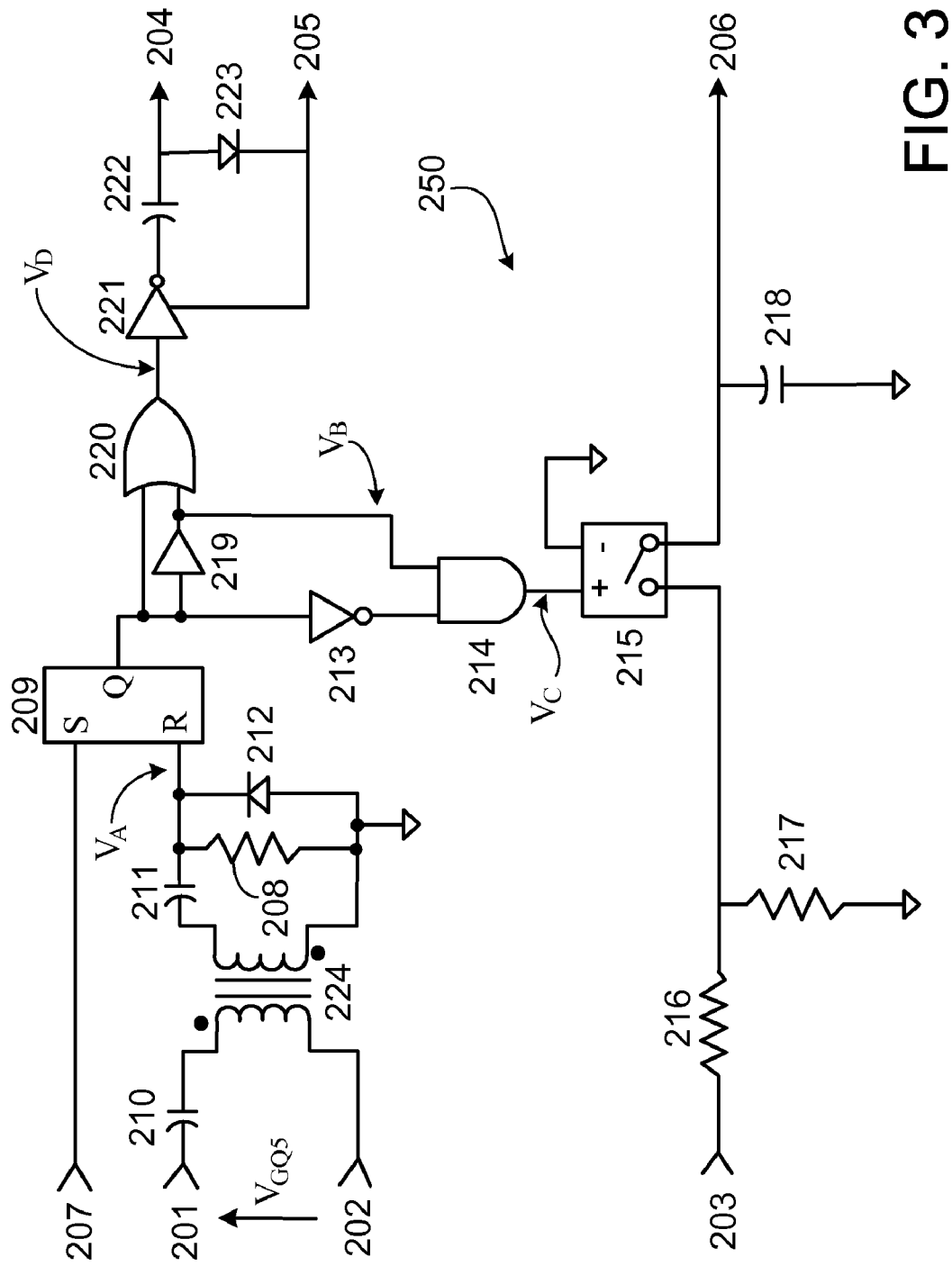
FIG. 3 is a schematic of a portion of an alternate control circuit for use with the converter of FIG. 1.

The transformer 224 in FIG. 2 must support the volt-seconds of the gate drive signal for the entire time that Q5 is ON. A modification allowing a smaller transformer to be used is shown in FIG. 3. Referring to FIG. 3, transformer 224 is used only to provide a short turn-off pulse to circuit 250 (in comparison to the full duration gate drive pulse for the circuit 200 in FIG. 2). Circuit 250 in FIG. 3 is similar to that in FIG. 2 except that a primary-side input 207 connected to the set input of a Flip-Flop 209 is added and the polarity of the secondary winding of transformer 224 is reversed so that $V_A$ is proportional to $-V_{GC5}$. Circuit 250 (FIG. 3) operates in a manner similar to circuit 200 (FIG. 2) except that a primary-side control signal is used to set Flip-Flop 209, turning the clamp switch Q3 ON, and the secondary-side gate drive signal from secondary switch Q5 is used to reset Flip-Flop 209, turning the clamp switch Q3 OFF, when the secondary current returns to zero at the end of the energy-transfer phase.

Figure 4A:
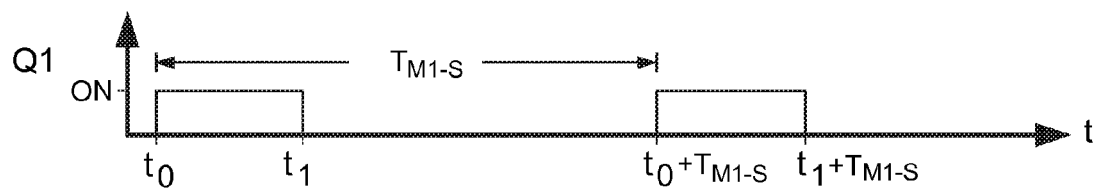
FIG. 4A through FIG. 4I show operating waveforms for the converter of FIG. 1.
Figure 4B:
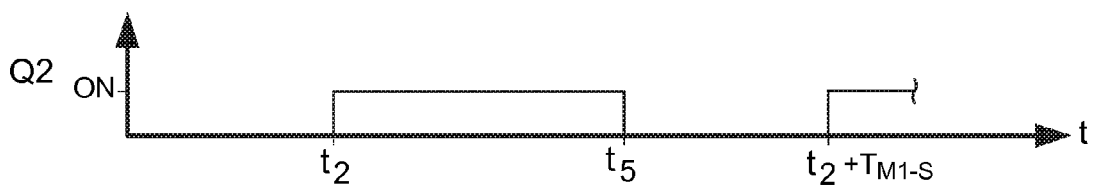
Figure 4C:
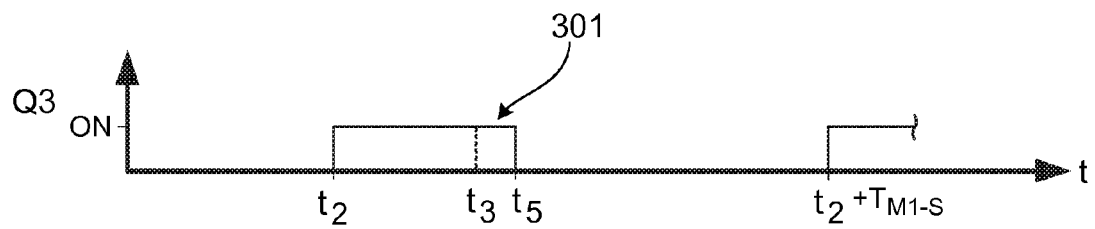
Figure 4D:
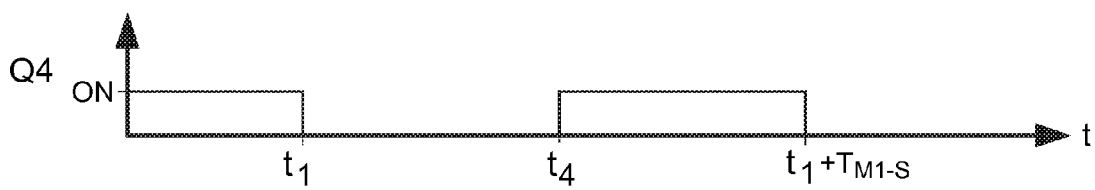
Figure 4E:
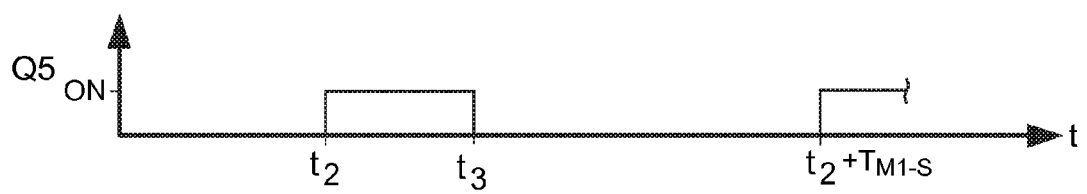
Figure 4F:
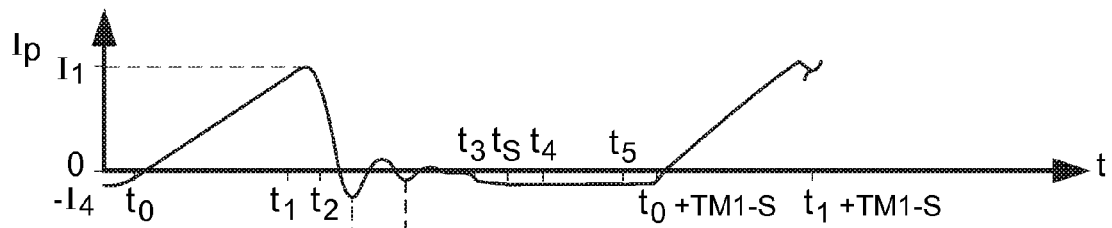
Figure 4I:
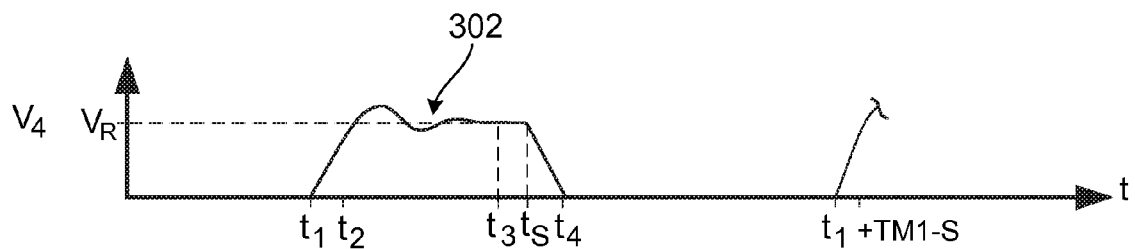

Referring to FIGS. 4B, 4C, primary switch Q2 is also turned ON at time $t_2$. The same control signal used to turn primary switch Q2 ON therefore may also be used to turn the clamp switch Q3 ON. Referring to FIG. 3, at about time $t_2$, the primary-side controller provides a signal to turn Q2 and Q5 ON, setting Flip-Flop 209. As a result, the Flip-Flop output Q goes high forcing the output, $V_D$, of OR gate 220 high (which turns the clamp switch Q3 ON) and also forcing the output of inverter 213, and thus the output, $V_C$, of AND gate 214, low (which keeps the sample switch 215 OFF). After the small delay provided by gate 219, signal $V_B$ also goes high affecting no change in either $V_C$ or $V_D$.

At about time $t_3$, the secondary-side switch controller turns secondary switch Q5 OFF. The falling gate drive voltage $V_{GQ5}$ (FIG. 5B) coupled to transformer 224 causes the signal $V_A$ to go high clearing Flip-Flop 209. As a result, the output Q of Flip-Flop 209 goes low, forcing the output, $V_C$, of AND gate 214 high which turns the sample switch 215 ON at around time $t_3$ until the low signal propagates through gate 219 as discussed above. Because of the delay provided by gate 219, the output, $V_D$, of OR gate 220 remains high (keeping the clamp switch Q3 ON). And after the small delay provided by gate 219, signal $V_B$ goes low again turning the sample switch 215 OFF and turning the clamp switch Q3 OFF at around time $t_S$ as discussed above in connection with FIGS. 2 and 5A-5H.

Using the circuit 250 of FIG. 3, the transformer 224 need not support the volt-seconds of the entire gate drive signal, but rather need only support a short turn-off pulse to reset Flip-Flop 209.

The sampled-feedback circuits 200 and 250 discussed above sample the voltage $V_A$ at node 132 as an approximation of the voltage $V_R$ across the clamp capacitor under the assumption that the voltage $V_{Q3}$ across the clamp switch Q3 (FIG. 6) is small compared to $V_R$ and constant. However, the temperature coefficient of clamp switch Q3 may affect the accuracy of the assumption and the sampled voltage. During the sample acquisition phase, reverse current builds in the primary winding (in the direction towards node 130) in proportion to $V_A/L_M$. If the duration of the sample acquisition phase, the value of magnetizing inductance, $L_M$, and the ON resistance of switch Q3 are constant, the voltage drop across switch Q3, $V_{Q3}$, at any particular point in time during the sample acquisition phase will remain constant from one cycle to another, presenting a constant error that may be corrected using the ratio of the divider formed by resistors 216 and 217. However, the ON resistance of switch Q3 may increase with increasing temperature causing a temperature dependent error in the sampled voltage (due to the resulting increase in $V_{Q3}$), which may vary between cycles. Compensation for the temperature dependent changes in the ON-resistance of the clamp switch Q3 may be provided, for example, by adding a thermistor or thermistor network (not shown) to the divider network 216, 217. Alternatively, the controller may include a temperature compensation algorithm to compensate for the temperature dependent error.

Figure 7:
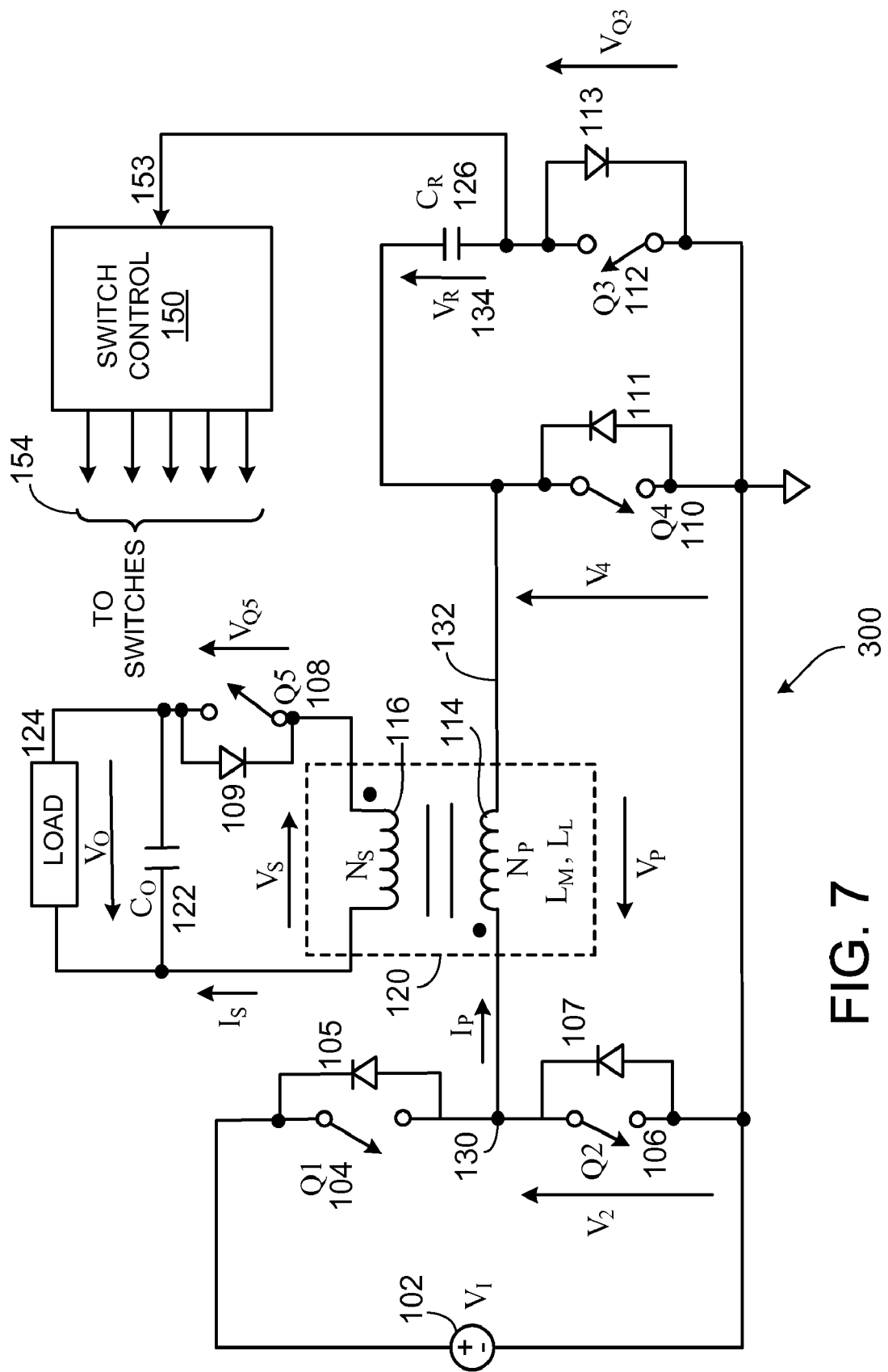
FIG. 7 is a schematic of a double-clamped buck-boost power converter using primary-side sampled feedback control.
Figure 9A:
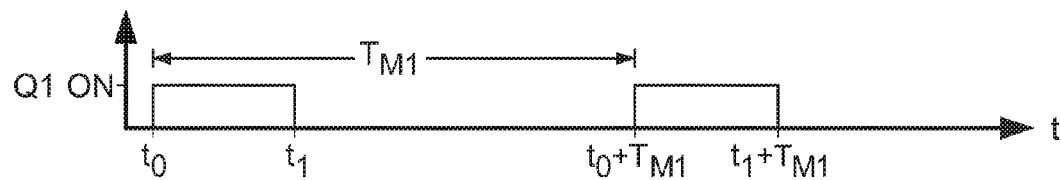
FIG. 9A through FIG. 9J show operating waveforms for the converters of FIGS. 7 and 8.
Figure 9B:
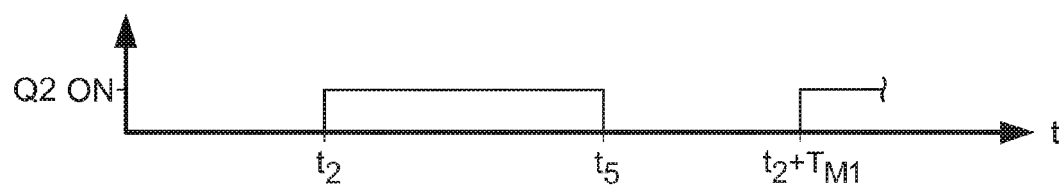
Figure 9C:
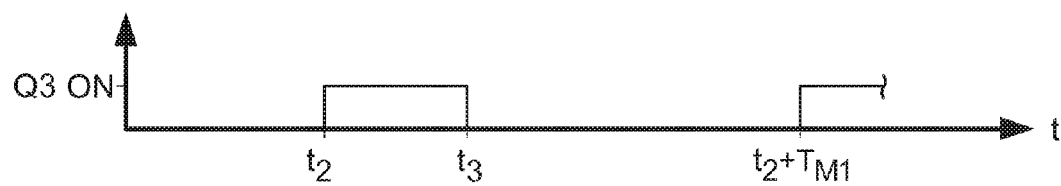
Figure 9D:
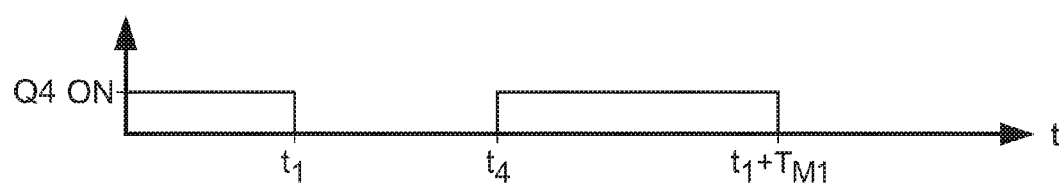
Figure 9E:
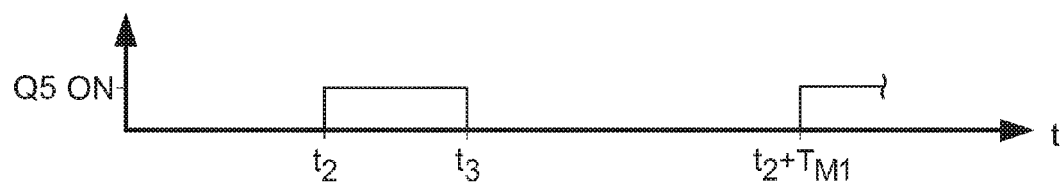
Figure 9F:
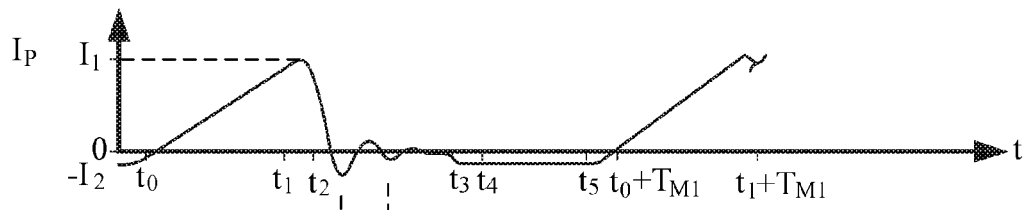
Figure 9G:
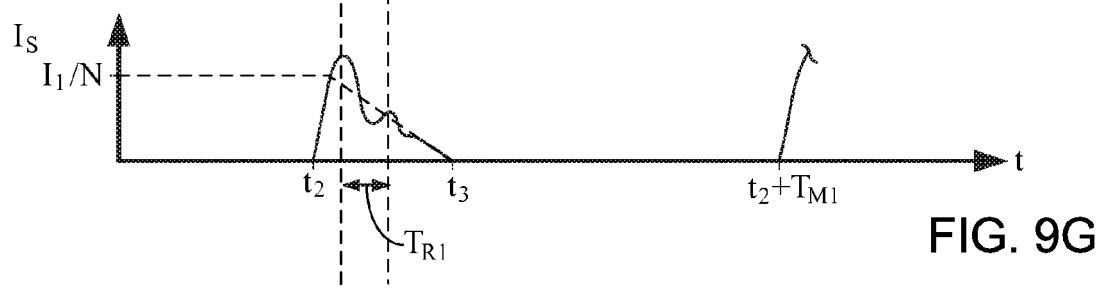
Figure 9H:
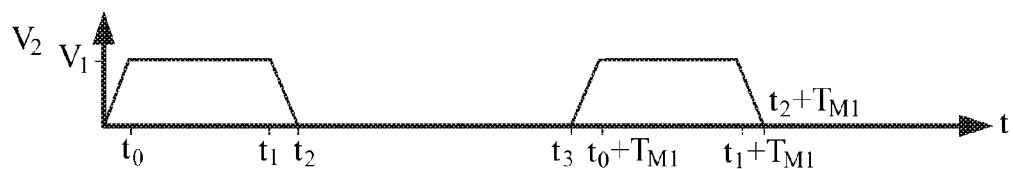
Figure 9I:
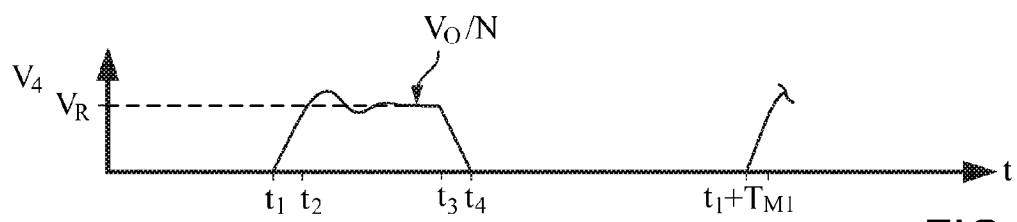
Figure 9J:
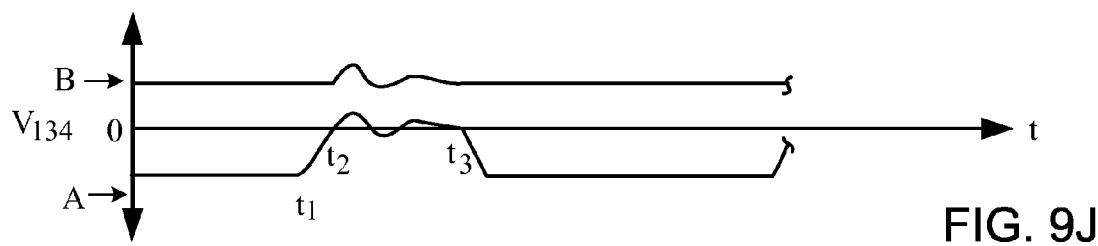

As described above and illustrated in FIGS. 1 and 4A-4I, the primary side sampled feedback system may sense the clamp capacitor voltage at node 132 while switch Q3 remains ON for a short time after the secondary switch Q5 is turned OFF during a sample acquisition phase (from $t_3$ to $t_S$) in a modified timing architecture (FIG. 4). An alternative sensing scheme is shown in the converter 300 of FIG. 7 which may avoid modification of the converter timing architecture. The primary side sampled feedback system in FIG. 7 has the input 153 connected to sense the voltage, $V_{Q3}$, at node 134 which approximates the clamp capacitor voltage, $V_R$, while switch Q3 is OFF and switch Q4 is ON (e.g., between time $t_4$ and $t_1$ of the next operating cycle). Operating waveforms for the converter of FIG. 7 are shown in FIGS. 9A-9J. Waveform A in FIG. 9J is representative of the voltage at node 134 for the converter shown in FIG. 7. It may be advantageous to acquire the voltage sample when the primary current is relatively low, e.g. during the clamp phase ($t_4$ to $t_5$), in which case the control pulse may be derived from the Q4 turn ON control signal. The configuration shown in FIG. 7 therefore does not require the modification of the converter operating cycle shown in FIG. 4 to accommodate a non-coincident sample acquisition phase. Instead, a coincident sample acquisition may occur during one or more of the other basic phases, such as the clamp phase, shown in FIGS. 9A-9J.

Figure 8:
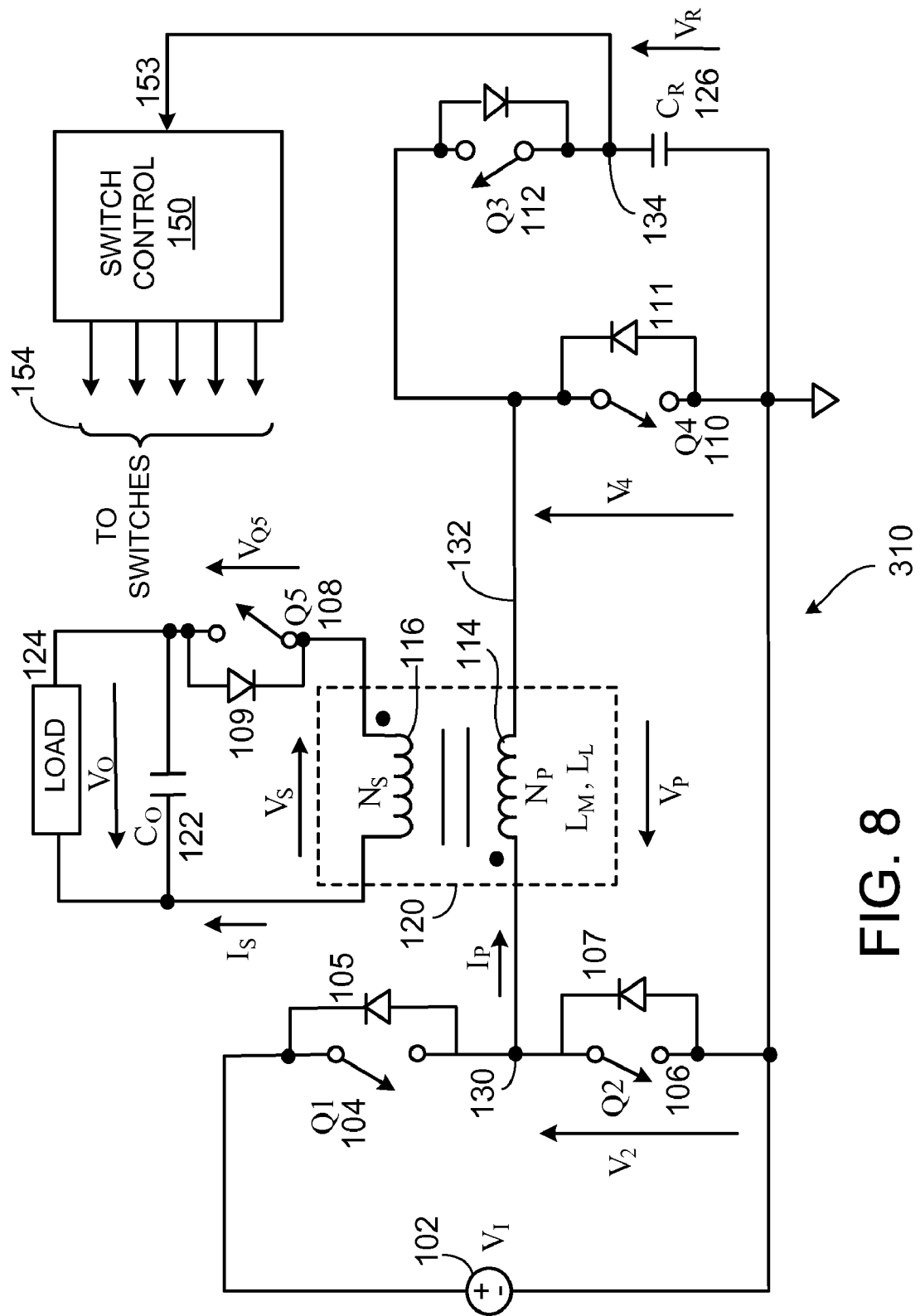
FIG. 8 is a schematic of a double-clamped buck-boost power converter using primary-side sampled feedback control.

Referring to FIG. 8, another alternative is shown in the converter 310. Like FIG. 7, the primary side sampled feedback system in FIG. 8 has an input 153 connected to node 134. Because the clamp switch Q3 and clamp capacitor have been switched in FIG. 8, the input 153 now provides a direct measure of the clamp capacitor voltage, $V_R$. Waveform B in FIG. 9J is representative of the voltage at node 134 for the converter shown in FIG. 7. In the converter of FIG. 8, the controller 150 may acquire a sample at any time, but preferably not between times $t_2$ and $t_3$ to avoid the errors discussed above in connection with the secondary current and ringing. The gate control signal for turning switch Q4 ON at time $t_4$ may conveniently be used to generate the control signal for the sample acquisition circuit and the sample may be acquired during the entire time that Q4 is ON.

Figure 15:
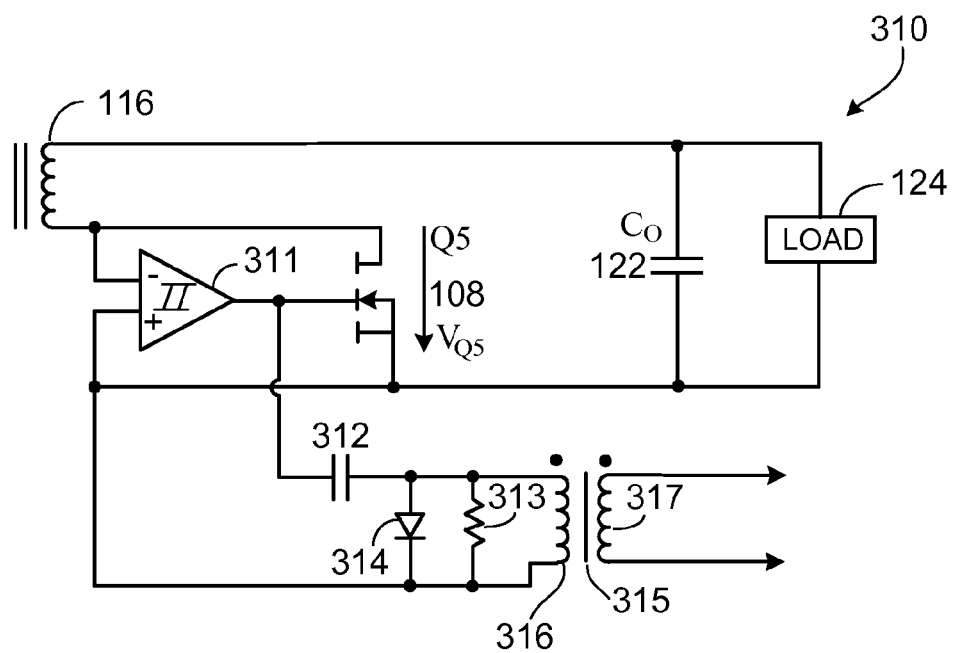
FIG. 15 shows a secondary side controller.

Referring to FIG. 15, secondary-side control circuitry 310 is shown having a driver 311 with inputs connected to sense the voltage, $V_{Q5}$, across switch Q5 and an output connected to drive the gate of switch Q5. Driver 311 turns switch Q5 OFF to block current when the voltage, $V_{Q5}$, across switch Q5 is negative (using the conventions shown in FIGS. 1, 7, 8, 15, and 16) and otherwise to turn switch Q5 ON to conduct current. In other words, driver 311 detects the voltage across and drives switch Q5 to act as an ideal diode.

A primary-side signal is generally required to indicate that the secondary current has passed through zero (the occurrence of time $t_3$), e.g. to turn the clamp switch Q3 OFF after a short sample-acquisition phase in the Mode 1-S or without delay in the Mode 1 timing architectures. As shown in FIG. 15, winding 316 of pulse transformer 315 may be connected across the output of driver 311 to provide a pulse (on the primary side of the isolation boundary) indicating that the secondary current has reached zero and to signal the occurrence of time $t_3$. When the output of driver 311 rises (turning secondary switch Q5 ON), capacitor 312 is quickly charged through diode 314. At the end of secondary conduction when the secondary current passes through zero, the output of driver 311 transitions low (turning secondary switch Q5 OFF) sending the pulse through pulse transformer 315. Resistor 313 may be used to provide damping for the pulse.

During operation, capacitor 312 (FIG. 15) is charged and discharged during each converter operating cycle resulting in additional power dissipation proportional to the value of capacitor 312. The value of C1 should be kept small in comparison with the gate capacitance of switch Q5 to minimize the incremental power required by the control circuit. Minimization of capacitance 312, however, requires increasing the magnetizing inductance of transformer 315 for any specified signal level. Such an increase conflicts with the cost reducing goals of minimizing the area and number of turns required for transformer 315 (which may be embedded in a PCB) because increasing the magnetizing inductance generally requires an increase in the number of turns or size of the transformer.

Figure 16:
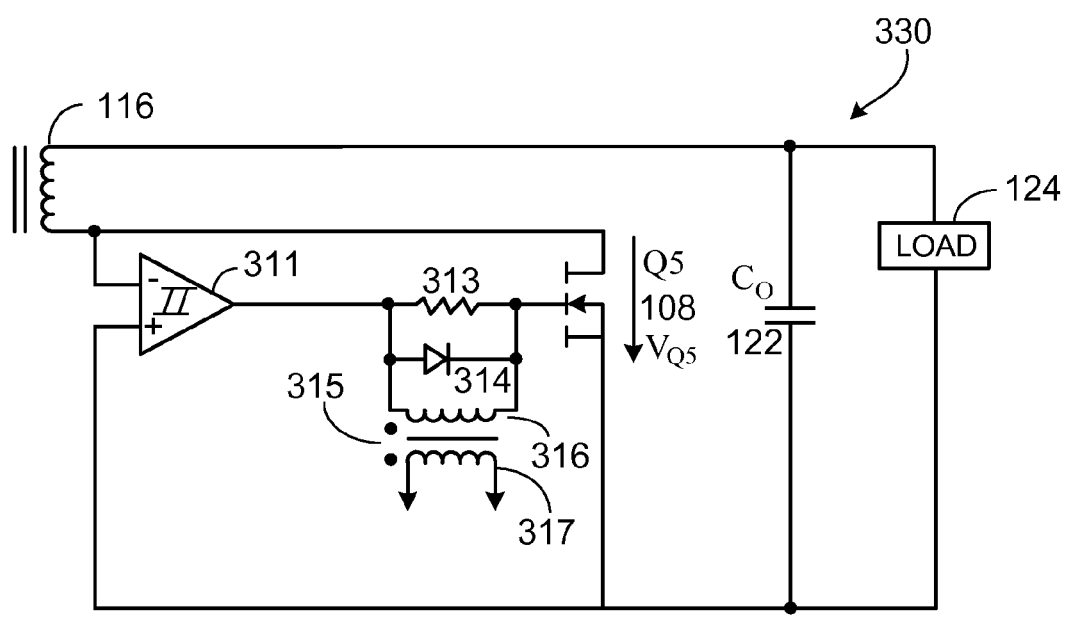
FIG. 16 shows an alternate secondary side controller.

Referring to FIG. 16, an alternate secondary-side control circuit 330 is shown which uses the gate capacitance of switch Q5 to drive the pulse transformer 315. As shown, winding 316 is connected in series with the drive path for the gate of secondary switch Q5. The gate capacitance of switch Q5 provides a sufficiently large capacitance in series with the primary winding without increasing the drive requirements of the driver 311. Resistor 313 may be used to provide damping for the transformer and to lower the total impedance in the Q5 gate drive path. Optional diode 314 may be added to improve the shape of the transmitted signal in applications requiring only one edge per cycle. Diode 314 helps reduce undershoot in the signal increasing the ratio of the amplitude of the negative pulse to the amplitude of the undershoot, and improving the noise margin. Winding 317 may be connected to primary side control circuitry such as shown in FIG. 3 for Mode 1-S or used to turn clamp switch Q3 OFF directly in Mode 1 operation.

Figure 14:
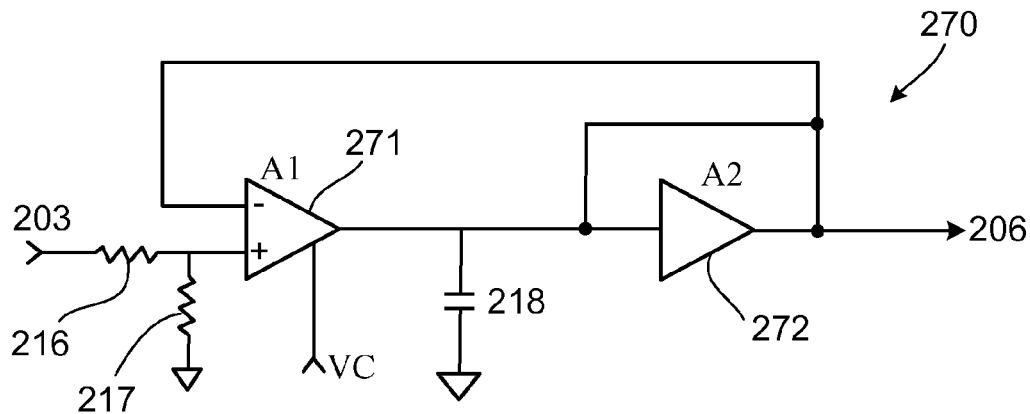
FIG. 14 shows an alternate sample and hold circuit for use with the sampled feedback control.

Referring to FIG. 14, an alternative sample and hold circuit 270 is shown for use with the sampled feedback system. Like the sample and hold circuitry shown in FIGS. 2 and 3, sample and hold circuit 270 includes an input connection 203 which may be connected as discussed above to sense the voltage across the clamp capacitor 126, an output connection 206 for connection to a feedback control circuit, and an input for receiving the gating signal Vc. A difference amplifier 271 provides buffering for the input signal and charges or discharges the sample and hold capacitor 218 to match the input voltage when the gating control signal Vc is present. At other times, the output of amplifier 271 is kept in a high impedance state. Unity gain buffer amplifier 272 provides a high impedance input across capacitor 218 and drives the sample and hold output 206 to minimize discharge of the sample voltage.

Figure 10:
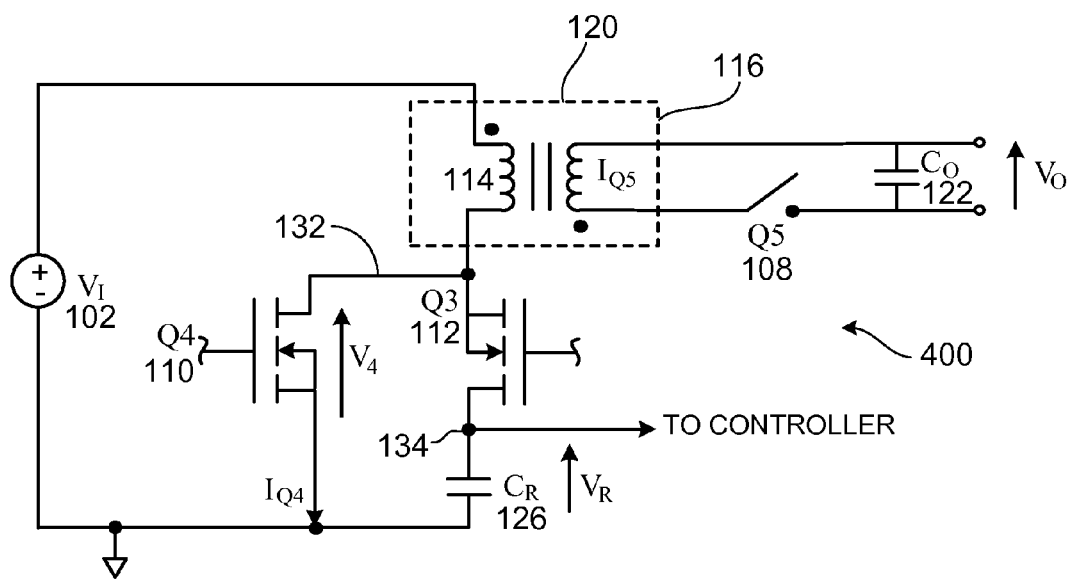
FIG. 10 is a schematic of a fly-back power converter using primary-side sampled feedback control.
Figure 11A:
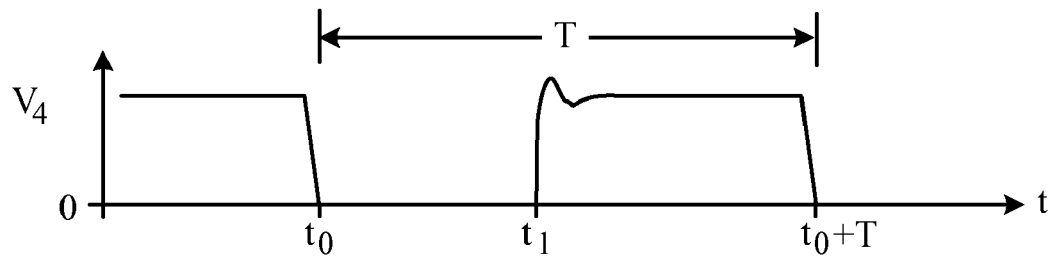
FIG. 11A through FIG. 11D show waveforms for the converter of FIG. 10 operating in continuous conduction mode.
Figure 11B:
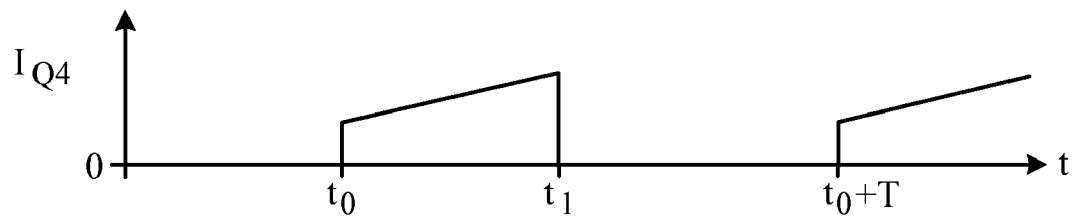
Figure 11C:
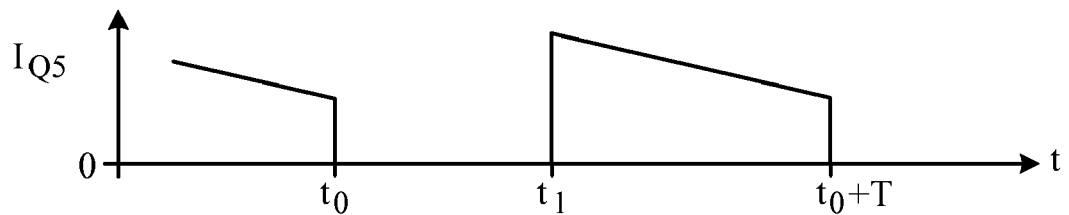
Figure 11D:
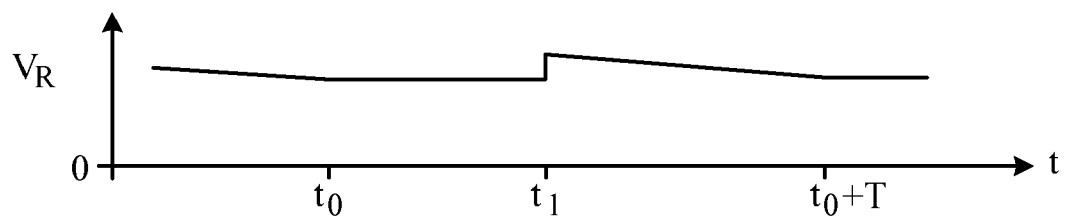

Referring to FIG. 10, a clamp switch and a clamp capacitor may be added to a fly-back converter 400. With the clamp switch Q3 closed, the clamp capacitor forms a resonant circuit with the primary reflected leakage inductance of the transformer. The clamp switch may be closed after the primary switch Q4 is opened to control overshoot and ringing during the transitions at time $t_1$. The voltage, $V_R$, across the clamp capacitor $C_R$ (node 134) will charge to a voltage essentially equal to the sum of the input voltage and the primary reflected output voltage. The controller (not shown) may subtract the input voltage $V_1$ from the clamp voltage $V_R$ for use in a primary-side sampled-feedback voltage control system. The converter 400 has the advantage of using a ground-referenced primary switch.

Figure 12:
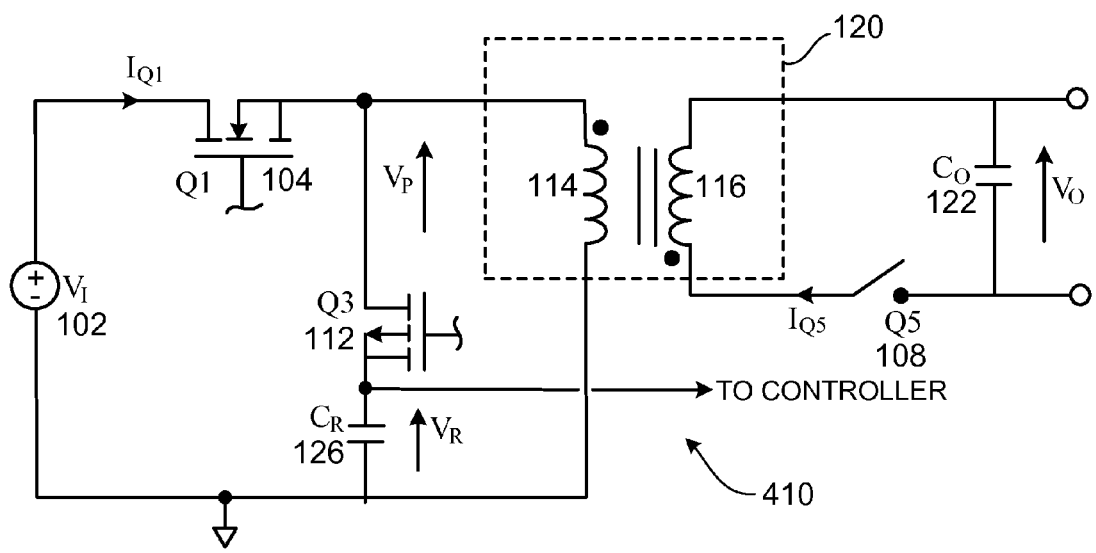
FIG. 12 is a schematic of a fly-back power converter using primary-side sampled feedback control.
Figure 13A:
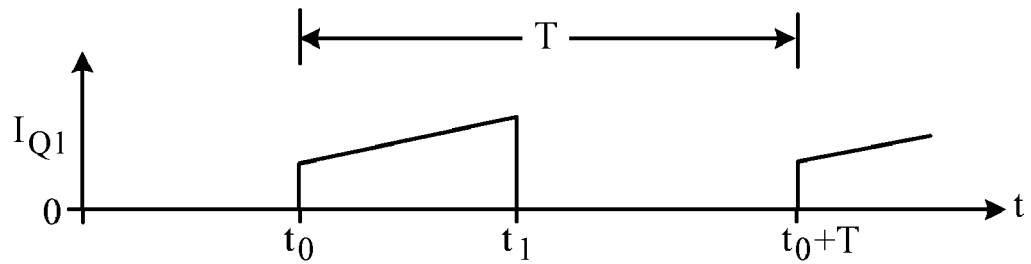
FIG. 13A through FIG. 13D show waveforms for the converter of FIG. 12 operating in continuous conduction mode.
Figure 13B:
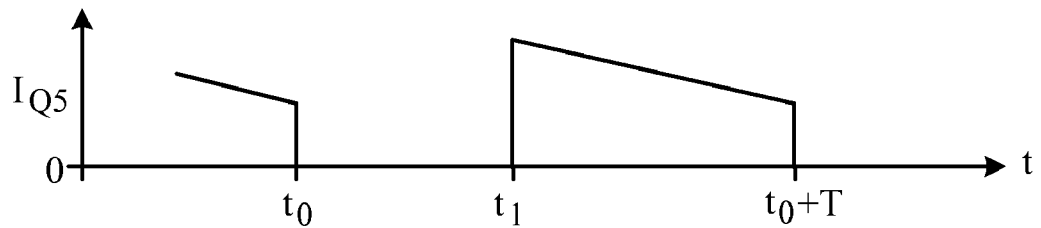
Figure 13C:
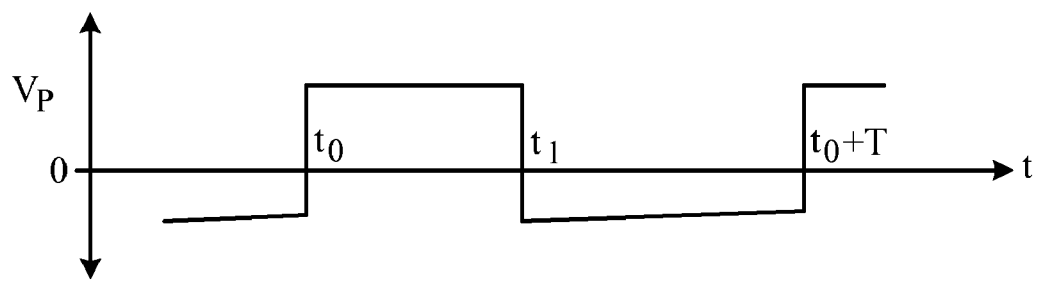
Figure 13D:
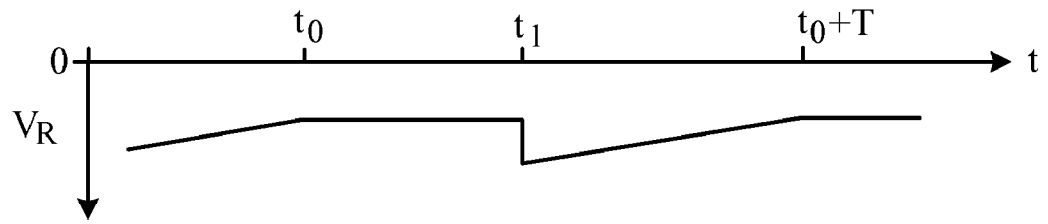

Referring to FIG. 12, an alternate fly-back converter 410 is shown with the primary switch Q1 connected in series at the high-side of the primary winding and the clamp circuit connected across the primary winding 114. Because the clamp circuit is connected across the primary winding in the converter 410 of FIG. 12, the clamp capacitor will charge to a voltage that is essentially equal to the primary reflected output voltage. The converter 410 has the advantage of providing a direct measure of the primary reflected output voltage at the expense of driving a high side primary switch.

Fly-back converters 400 and 410 may operate in either discontinuous conduction or continuous conduction mode. Waveforms for converters 400 and 410 operating in continuous conduction mode are respectively shown in FIGS. 11A-11D and FIGS. 13A-13D. The controller may sample the clamp capacitor voltage during each converter operating cycle preferably before time $t_1$ or after the start of the next converter operating cycle, time $t_{0+T}$ to minimize errors due to the non-zero current in secondary switch Q5. As shown in FIG. 3D, the clamp capacitor voltage $V_R$ is negative in the converter topology of FIG. 12.

Additionally, clamp switches (not shown) may be connected across the primary winding 114. During an added clamp phase, the clamp switches may be closed to effectively short circuit the primary winding storing energy in the transformer. Afterward, the clamp switches may be opened to provide ZVS turn-ON of the primary switch.

A number of embodiments of the invention have been described. Nevertheless, it will be understood that various modifications may be made without departing from the spirit and scope of the invention. For example, the sample and hold circuit may sample the difference between $V_2$ and $V_4$ in the arrangements of FIGS. 1 and 7.

Additionally, the controller may estimate the level of output current to improve regulation of remote loads for example by correcting for resistance in the output path. With the output voltage, $V_O$, constant, the output current is approximately proportional to the difference between the square of the error amplifier output and a constant (which is proportional to the current flowing during the clamp phase).

Accordingly, other embodiments are within the scope of the following claims.

What is claimed is:

1. A method for converting power via a transformer from an input source for delivery to a load comprising:
   providing a primary power circuit including a primary winding of the transformer, at least one primary switch connected to drive the primary winding, a clamp capacitor, and a clamp switch to connect the clamp capacitor to the primary winding;
   providing secondary circuitry including a secondary winding of the transformer and rectification circuitry connected to the secondary winding and to deliver a rectified output voltage to the load;
   providing a switch controller to operate the at least one primary switch and the clamp switch in a series of converter operating cycles;
   each converter operating cycle being characterized by a current in the secondary winding varying between a maximum value and a minimum value;
   detecting when the current in the secondary winding essentially reaches the minimum value and generating a first signal in response; and
   sampling a voltage in the primary power circuit in response to the first signal as a measure of the output voltage.

2. A method comprising:
   converting power, received at an input from an input source at an input voltage, via a transformer for delivery to a load at an output voltage, in a series of converter operating cycles;
   wherein each converter operating cycle includes the following:
   (a) transferring energy from the input source to a primary winding of the transformer during an energy-storage phase characterized by an average value of primary current flowing in the primary winding, the average value of primary current has a first polarity, and the average is taken over the duration of the energy-storage phase,
   (b) transferring energy from a secondary winding of the transformer to the load during an energy-transfer phase characterized by connecting a clamp capacitor to the transformer, and
   (c) sensing a voltage across the clamp capacitor during a sample-acquisition phase characterized by the voltage across the clamp capacitor during the sample-acquisition phase being essentially a function of the primary reflected output voltage; and
   controlling the output voltage as a function of the sensed voltage across the clamp capacitor.

3. The method of claim 1 wherein each converter operating cycle includes a first time interval during which the current in the secondary winding remains essentially equal to the minimum value and one end of the primary winding is connected to a common reference potential.

4. The method of claim 1 wherein the sampling a voltage in the primary power circuit comprises sensing a voltage across the clamp capacitor.

5. The method of claim 1 wherein the sampling a voltage in the primary power circuit comprises sensing a voltage across the primary winding.

6. The method of claim 1 wherein the minimum value is essentially zero current.

7. The method of claim 1 wherein each converter operating cycle further comprises an energy-transfer phase during which energy is transferred from the secondary winding to the load and the current in the secondary winding decreases to essentially zero current.

8. The method of claim 1 wherein each converter operating cycle further comprises an energy transfer phase during which energy is transferred from the secondary winding to the load and which is terminated before the current in the secondary winding decreases to essentially zero current.

9. The method of claim 2 wherein the sample-acquisition phase is not coincident with other phases of the converter operating cycle.

10. The method of claim 9 wherein the sample acquisition phase occurs after the energy transfer phase.

11. The method of claim 2 wherein the sample-acquisition phase is coincident with at least one other phase of the converter operating cycle.

12. The method of claim 11 wherein the sample acquisition phase occurs during the energy storage phase.

13. The method of claim 2 wherein the sample acquisition phase occurs anytime during the converter operating cycle except during the energy-transfer phase.

14. The method of claim 2 wherein each converter operating cycle further comprises (d) a clamp phase during which the primary winding of the transformer is clamped, the clamp phase being characterized by essentially zero voltage across said primary winding and an average value of current flowing in the primary winding, the average value of current having a second polarity, wherein the average is taken over the duration of the clamp phase and the second polarity is opposite of the first polarity.

15. The method of claim 14 wherein the sample acquisition phase occurs during the clamp phase.

16. The method of claim 2 wherein the voltage across the clamp capacitor during the sample phase is essentially equal to the primary reflected output voltage.

17. The method of claim 2 wherein the sample acquisition phase is further characterized by essentially zero current flowing in the secondary winding.

18. The method of claim 2 wherein one end of the primary winding is connected to a common reference terminal during at least a portion of the converter operating cycle.

19. The method of claim 2 wherein one end of the primary winding is connected to a common reference terminal during the sample acquisition phase.

20. The method of claim 2 wherein the energy transfer phase is further characterized by one end of the primary winding being connected to a common reference terminal.

21. The method of claim 2 wherein the energy transfer phase is further characterized by the current in the secondary winding decreasing to essentially zero.

22. The method of claim 2 wherein the energy transfer phase is terminated before the current in the secondary winding decreases to essentially zero current.

23. The method of claim 1 or 2 further comprising forming a resonant circuit including the primary winding and the clamp capacitor.

24. The method of claim 2 further comprising:
   detecting when a current in the secondary winding essentially reaches a minimum value during the energy-transfer phase and generating a first signal in response; and
   initiating the sample-acquisition phase in response to the first signal.

25. The method of claim 24 wherein the detecting comprises sensing a change in polarity of a voltage across a secondary switch.

26. The method of claim 24 wherein the detecting comprises sensing a change in voltage across the secondary winding.

27. The method of claim 24 wherein the detecting comprises sensing a change in a control signal for operating a secondary switch.

28. The method of claim 24 wherein the detecting comprises sensing when a secondary switch opens.

29. The method of claim 24 wherein the detecting comprises sensing a change in voltage across a rectifier connected to the secondary winding.

30. The method of claim 24 wherein the detecting comprises sensing a current in the secondary winding.

31. The method of claim 1 wherein the rectification circuitry comprises a secondary switch and the detecting comprises sensing a change in polarity of a voltage across the secondary switch.

32. The method of claim 1 wherein the detecting comprises sensing a change in voltage across the secondary winding.

33. The method of claim 1 wherein the rectification circuitry comprises a secondary switch and the first signal is generated from a control signal for operating the secondary switch.

34. The method of claim 1 wherein the detecting comprises sensing a change in voltage across a portion of the rectification circuitry.

35. The method of claim 1 wherein the detecting comprises sensing the current in the secondary winding.

36. Apparatus for converting power via a transformer from an input source for delivery to a load comprising:
   a primary power circuit including a primary winding of the transformer, at least one primary switch connected to drive the primary winding, a clamp capacitor, and a clamp switch to connect the clamp capacitor to the primary winding;
   secondary circuitry including a secondary winding of the transformer and rectification circuitry connected to the secondary winding and to deliver a rectified output voltage to the load;
   a switch controller to operate the at least one primary switch and the clamp switch in a series of converter operating cycles, each converter operating cycle being characterized by a current in the secondary winding varying between a maximum value and a minimum value;
   the controller to detect when the current in the secondary winding essentially reaches the minimum value and generate a first signal in response, and to sample a voltage in the primary power circuit in response to the first signal as a measure of the output voltage.

37. Apparatus for converting power from an input source at an input voltage for delivery to a load at an output voltage, the apparatus comprising,
   a transformer having a primary winding and a secondary winding,
   secondary circuit elements connected to the secondary winding to deliver power to the load at the output voltage,
   active clamp circuitry connected to the transformer and including a clamp switch and a clamp capacitor,
   one or more primary switches connected to the primary winding,
   a switch controller to operate the clamp switch and the one or more primary switches in a series of converter operating cycles, each converter operating cycle comprising the following phases:
   (a) an energy-storage phase during which energy is transferred from the input source to the primary winding of the transformer and characterized by an average value of primary current flowing in the primary winding, the average value of primary current having a first polarity, and the average being taken over the duration of the energy-storage phase,
   (b) an energy-transfer phase during which energy is transferred from the secondary winding of the transformer to the load and characterized by connecting the clamp capacitor to the transformer, and
   (c) a sample-acquisition phase during which a voltage across the clamp capacitor is sensed and characterized by the voltage across the clamp capacitor during the sample-acquisition phase being essentially a function of the primary reflected output voltage; and
   wherein the controller is to control the output voltage as a function of the sensed voltage across the clamp capacitor.

38. The apparatus of claim 36 wherein each converter operating cycle includes a first time interval during which the current in the secondary winding remains essentially equal to the minimum value and one end of the primary winding is connected to a common reference potential.

39. The apparatus of claim 36 wherein the controller is to sample a voltage across the clamp capacitor.

40. The apparatus of claim 36 wherein each converter operating cycle further comprises an energy-transfer phase during which energy is transferred from the secondary winding to the load and the current in the secondary winding decreases to essentially zero current.

41. The apparatus of claim 36 wherein each converter operating cycle further comprises an energy transfer phase during which energy is transferred from the secondary winding to the load and which is terminated before the current in the secondary winding decreases to essentially zero current.

42. The apparatus of claim 37 wherein the sample-acquisition phase occurs during the energy storage phase.

43. The apparatus of claim 37 wherein each converter operating cycle further comprises (d) a clamp phase during which the primary winding of the transformer is clamped, the clamp phase being characterized by essentially zero voltage across said primary winding and an average value of current flowing in the primary winding, the average value of current having a second polarity, wherein the average is taken over the duration of the clamp phase and the second polarity is opposite of the first polarity.

44. The apparatus of claim 37 wherein the controller further detects when a current in the secondary winding essentially reaches a minimum value during the energy-transfer phase and generate a first signal in response; and
   initiate the sample-acquisition phase in response to the first signal.

45. The apparatus of claim 36 wherein the rectification circuitry comprises a secondary switch and the controller is to detect a change in polarity of a voltage across the secondary switch.

46. The apparatus of claim 36 wherein the rectification circuitry comprises a secondary switch and the first signal is generated from a control signal for operating the secondary switch.

* * * * *

UNITED STATES PATENT AND TRADEMARK OFFICE
CERTIFICATE OF CORRECTION

| | | |
|---|---|---|
| PATENT NO. | : 7,859,859 B2 | Page 1 of 1 |
| APPLICATION NO. | : 11/601890 | |
| DATED | : December 28, 2010 | |
| INVENTOR(S) | : John P. Clarkin | |

It is certified that error appears in the above-identified patent and that said Letters Patent is hereby corrected as shown below:

Col. 5, line 46, delete "1 ." and insert -- 1. --.

Col. 14, line 49, delete "3D," and insert -- 13D --.

Signed and Sealed this

Twenty-seventh Day of September, 2011

David J. Kappos
*Director of the United States Patent and Trademark Office*